(12) United States Patent
Nakanishi et al.

(10) Patent No.: US 11,088,393 B2
(45) Date of Patent: Aug. 10, 2021

(54) BATTERY

(71) Applicant: Toyota Jidosha Kabushiki Kaisha, Toyota Aichi-ken (JP)

(72) Inventors: Shinji Nakanishi, Mishima Shizuoka-ken (JP); Hiroshi Suyama, Mishima Shizuoka-ken (JP); Shingo Ohta, Susono Shizuoka-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/232,631

(22) Filed: Dec. 26, 2018

(65) Prior Publication Data

US 2019/0207249 A1 Jul. 4, 2019

(30) Foreign Application Priority Data

Dec. 28, 2017 (JP) .............................. JP2017-253799

(51) Int. Cl.
*H01M 10/0562* (2010.01)
*H01M 10/0585* (2010.01)
(Continued)

(52) U.S. Cl.
CPC ......... *H01M 10/0562* (2013.01); *H01M 4/62* (2013.01); *H01M 10/0585* (2013.01);
(Continued)

(58) Field of Classification Search
CPC ...................... H01M 10/0525; H01M 10/0562
See application file for complete search history.

(56) References Cited

U.S. PATENT DOCUMENTS 6,645,675 B1 * 11/2003 Munshi ............... H01B 1/122
252/62.2
8,986,895 B2 3/2015 Ohta et al.
(Continued)

FOREIGN PATENT DOCUMENTS

CN 102292849 A 12/2011
CN 103904290 A 7/2014
(Continued)

OTHER PUBLICATIONS

Office Action dated Oct. 18, 2019 in U.S. Appl. No. 16/126,137.
(Continued)

*Primary Examiner* — Sarah A. Slifka
*Assistant Examiner* — Rachel L Zhang
(74) *Attorney, Agent, or Firm* — Dinsmore & Shohl LLP

(57) ABSTRACT

A battery with excellent output characteristics and stability. The battery comprising a cathode, an anode and a separator disposed between the cathode and the anode, wherein the cathode comprises an aqueous electrolyte and a cathode active material; wherein the anode comprises an anode active material; wherein the separator comprises a first oxide electrolyte sintered body and a resin; wherein the first oxide electrolyte sintered body has grain boundaries between crystal particles of a garnet-type ion-conducting oxide represented by a general formula (A); wherein a number average particle diameter of the crystal particles is 3 µm or less; and wherein the first oxide electrolyte sintered body satisfies the following formula 1: $R_{gb}/(R_b+R_{gb}) \leq 0.6$ where $R_b$ is an intragranular resistance value that is an ion conductivity resistance inside the crystal particles, and $R_{gb}$ is a grain boundary resistance value that is an ion conductivity resistance of the grain boundaries between the crystal particles.

7 Claims, 15 Drawing Sheets

(51) Int. Cl.
*H01M 4/62* (2006.01)
*H01M 10/36* (2010.01)
*H01M 50/409* (2021.01)
*H01M 4/02* (2006.01)

(52) U.S. Cl.
CPC ......... *H01M 10/36* (2013.01); *H01M 50/409* (2021.01); *H01M 2004/028* (2013.01); *H01M 2300/0002* (2013.01); *H01M 2300/0071* (2013.01); *H01M 2300/0088* (2013.01)

(56) References Cited

U.S. PATENT DOCUMENTS

| | | | |
|---|---|---|---|
| 9,531,036 | B2 | 12/2016 | Ohta et al. |
| 2010/0233547 | A1* | 9/2010 | Baba ................ H01M 10/052 429/246 |
| 2011/0244337 | A1* | 10/2011 | Ohta ................ C04B 35/481 429/319 |
| 2012/0276457 | A1 | 11/2012 | Hirose et al. |
| 2013/0266842 | A1 | 10/2013 | Woehrle et al. |
| 2013/0323604 | A1 | 12/2013 | Teshima et al. |
| 2014/0099528 | A1 | 4/2014 | Lockett et al. |
| 2014/0162113 | A1 | 6/2014 | Ohta et al. |
| 2014/0227614 | A1 | 8/2014 | Lee et al. |
| 2015/0056519 | A1* | 2/2015 | Ohta ................ H01M 10/0562 429/320 |
| 2015/0280296 | A1* | 10/2015 | Kang ................ H01M 10/0569 429/405 |
| 2016/0211498 | A1 | 7/2016 | Kim et al. |
| 2017/0062823 | A1* | 3/2017 | Yamaguchi ......... H01M 10/058 |
| 2017/0117547 | A1* | 4/2017 | Fanous ................ H01M 4/364 |
| 2017/0271639 | A1 | 9/2017 | Yoshima et al. |
| 2017/0309916 | A1 | 10/2017 | Toyoda et al. |
| 2017/0346092 | A1 | 11/2017 | Yada et al. |
| 2017/0358829 | A1* | 12/2017 | Inoue ................ H01M 2/145 |
| 2018/0175446 | A1 | 6/2018 | Nishizaki et al. |
| 2018/0219253 | A1 | 8/2018 | Ohta |
| 2018/0248201 | A1 | 8/2018 | Shimoda et al. |
| 2019/0074543 | A1 | 3/2019 | Houjyou et al. |
| 2019/0088993 | A1 | 3/2019 | Ohta |
| 2019/0207248 | A1 | 7/2019 | Ohta |
| 2019/0207250 | A1 | 7/2019 | Nakanishi et al. |

FOREIGN PATENT DOCUMENTS

| | | |
|---|---|---|
| CN | 105811006 A | 7/2016 |
| CN | 106486671 A | 3/2017 |
| CN | 107437633 A | 12/2017 |
| EP | 3252024 A1 | 12/2017 |
| EP | 3410529 A1 | 12/2018 |
| JP | 2010-056027 A | 3/2010 |
| JP | 2012-096940 A | 5/2012 |
| JP | 2012-174659 A | 9/2012 |
| JP | 2013-037992 A | 2/2013 |
| JP | 2013-532361 A | 8/2013 |
| JP | 2013-219017 A | 10/2013 |
| JP | 2016-517157 A | 6/2016 |
| JP | 2017168317 A | 9/2017 |
| JP | 2017-216222 A | 12/2017 |
| KR | 1020170134231 A | 12/2017 |
| WO | 2012114193 A1 | 8/2012 |
| WO | 2014/176266 A1 | 10/2014 |
| WO | 2016210371 A1 | 12/2016 |
| WO | 2017018217 A1 | 2/2017 |
| WO | 2017130622 A1 | 8/2017 |

OTHER PUBLICATIONS

Yow, Zhen Feng et al., "Effect of Li+/H+ exchange in water treated Ta-doped Li7La3Zr2O12", Solid State Ionics 292, 2016, p. 122-129.
Awaka, Junji et al., "Single Crystal Synthesis of Cubic Garnet Related-Type Li7La3Zr2O12 by a Self-Flux Method", Key Engineering Materials, Jul. 4, 2011, p. 99-102, vol. 485.
Roof, Irina P. et al., "Crystal growth of a series of lithium garnets Ln3Li5Ta2O12 (Ln=La, Pr, Nd): Structural properties, Alexandrite effect and unusual ionic conductivity", Journal of Solid State Chemistry, Feb. 1, 2009, p. 295-300, vol. 182, No. 2.
Awaka, Junji et al., "Synthesis and structure analysis of tetragonal Li7La3Zr2O12 with the garnet-related type structure", Journal of Solid State Chemistry, 2009, p. 2046-2052, vol. 182, No. 8, Aug. 1, 2009.
Office Action dated Oct. 18, 2019 in U.S. Appl. No. 16/232,635.
Office Action dated Apr. 17, 2020 in U.S. Appl. No. 16/232,635.
Office Action dated Apr. 24, 2020 in U.S. Appl. No. 16/126,137.
Office Action dated Nov. 10, 2020 in U.S. Appl. No. 16/232,635.
Notice of Allowance dated Nov. 25, 2020 in U.S. Appl. No. 16/126,137.
"Crystal chemistry of 'Li7La3Zr2O12' garnet doped with Al, Ga, and Fe: a short review on local structures as revealed by NMR and Mößbauer spectroscopy studies", Daniel Rettenwander et al., European Journal of Mineralogy, vol. 28, No. 3, pp. 619-629, May 11, 2016.
Notice of Allowance dated Jun. 3, 2021 in U.S. Appl. No. 16/126,137.
Office Action dated Jun. 23, 2021 in U.S. Appl. No. 16/232,635.

* cited by examiner

Flux

Value z (H content ratio of raw material garnet-type oxide particles)

BATTERY

CROSS REFERENCE TO RELATED APPLICATIONS

This application claims priority to Japanese Patent Application No. 2017-253799 filed on Dec. 28, 2017, the entire contents of which are hereby incorporated by reference including the specification, drawings and abstract.

TECHNICAL FIELD

The disclosure relates to a battery.

BACKGROUND

A battery comprising an electrolyte that contains an aqueous solvent (that is, an aqueous electrolyte) is better in stability during working and storage, than a battery comprising an electrolyte that contains an organic solvent. Also, it generally has better output characteristics than a battery comprising a solid electrolyte.

In recent years, attention is drawn to a battery comprising a combination of an aqueous electrolyte and a solid electrolyte, which aims at improving ion conductivity between the cathode and the anode.

Patent Literature 1 discloses a technique of a lithium secondary battery comprising an ion-conducting aqueous solution, in which at least one of the cathode and anode contains powder of a lithium ion-conducting solid electrolyte. Patent Literature 1 also describes that a glass-ceramic having $Li_{1+x+z}Al_xTi_{2-x}Si_zP_{3-z}O_{12}$ as the main crystalline phase, where $0 \leq x \leq 0.4$ and $0 < z \leq 0.6$, is used as the lithium ion-conducting solid electrolyte powder.

Patent Literature 1: Japanese Patent Application Laid-Open No. 2010-056027

However, in the technique disclosed in Patent Literature 1, the anode is in contact with the aqueous solution (the aqueous electrolyte). As a result, reductive decomposition of water occurs at an interface between the aqueous electrolyte and the anode, resulting in problems such as no improvement in cycle characteristics of and unstable battery performance.

SUMMARY

The disclosed embodiments were achieved in light of the above circumstance of the battery comprising the aqueous electrolyte. An object of the disclosed embodiments is to provide a battery with excellent output characteristics and stability.

In a first embodiment, there is provided a battery comprising a cathode, an anode and a separator disposed between the cathode and the anode, wherein the cathode comprises an aqueous electrolyte and a cathode active material;

wherein the anode comprises an anode active material;

wherein the separator comprises a first oxide electrolyte sintered body and a resin;

wherein the first oxide electrolyte sintered body has grain boundaries between crystal particles of a garnet-type ion-conducting oxide represented by the following general formula (A):

General Formula (A)

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x, y and z are real numbers satisfying $3 \leq x-3y-z \leq 7$, $0 \leq y < 0.22$ and $0 \leq z < 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively;

wherein a number average particle diameter of the crystal particles is 3 μm or less; and wherein the first oxide electrolyte sintered body satisfies the following formula 1:

$$R_{gb}/(R_b + R_{gb}) \leq 0.6 \qquad \text{Formula 1}$$

where $R_b$ is an intragranular resistance value that is an ion conductivity resistance inside the crystal particles, and $R_{gb}$ is a grain boundary resistance value that is an ion conductivity resistance of the grain boundaries between the crystal particles.

The anode may be free from aqueous electrolyte.

The separator may be impermeable to aqueous electrolyte.

Also, the battery may be a battery wherein the cathode active material is a cathode active material covered with a second oxide electrolyte sintered body; wherein the second oxide electrolyte sintered body has grain boundaries between the crystal particles of the garnet-type ion-conducting oxide represented by the general formula (A); wherein a number average particle diameter of the crystal particles of the second oxide electrolyte sintered body is 3 μm or less; and wherein the second oxide electrolyte sintered body satisfies the formula 1 where $R_b$ is an intragranular resistance value that is an ion conductivity resistance inside the crystal particles of the second oxide electrolyte sintered body, and $R_{gb}$ is a grain boundary resistance value that is an ion conductivity resistance of the grain boundaries between the crystal particles thereof.

Also, the battery may be a battery wherein the cathode active material is a cathode active material covered with a second oxide electrolyte sintered body; wherein the second oxide electrolyte sintered body has grain boundaries between the crystal particles of the garnet-type ion-conducting oxide represented by the general formula (A); wherein a lithium-containing flux is present at grain boundary triple junctions between the crystal particles of the second oxide electrolyte sintered body; and wherein the second oxide electrolyte sintered body satisfies the formula 1 where $R_b$ is an intragranular resistance value that is an ion conductivity resistance inside the crystal particles of the second oxide electrolyte sintered body, and $R_{gb}$ is a grain boundary resistance value that is an ion conductivity resistance of the grain boundaries between the crystal particles thereof.

According to the battery of the disclosed embodiments, since the aqueous electrolyte is separated from the anode by the specific separator, reductive decomposition of water can be prevented without a decrease in ion conductivity between the cathode and the anode, and the potential window of the aqueous electrolyte can be extended. As a result, the battery of the disclosed embodiments has better output characteristics and stability than conventional batteries.

BRIEF DESCRIPTION OF THE DRAWINGS

In the accompanying drawings.

DETAILED DESCRIPTION

1. Battery

The battery according to the disclosed embodiments is a battery comprising a cathode, an anode and a separator disposed between the cathode and the anode, wherein the cathode comprises an aqueous electrolyte and a cathode active material;

wherein the anode comprises an anode active material;

wherein the separator comprises a first oxide electrolyte sintered body and a resin;

wherein the first oxide electrolyte sintered body has grain boundaries between crystal particles of a garnet-type ion-conducting oxide represented by the following general formula (A):

$$(Li_{x-3y-z}E_y H_z)L_\alpha M_\beta O_\gamma \qquad \text{General Formula (A)}$$

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x, y and z are real numbers satisfying $3 \leq x-3y- \leq 7$, $0 \leq y < 0.22$ and $0 \leq z < 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively;

wherein a number average particle diameter of the crystal particles is 3 μm or less; and wherein the first oxide electrolyte sintered body satisfies the following formula 1:

$$R_{gb}/(R_b+R_{gb}) \leq 0.6 \qquad \text{Formula 1}$$

where $R_b$ is an intragranular resistance value that is an ion conductivity resistance inside the crystal particles, and $R_{gb}$ is a grain boundary resistance value that is an ion conductivity resistance of the grain boundaries between the crystal particles.

Figure 1:
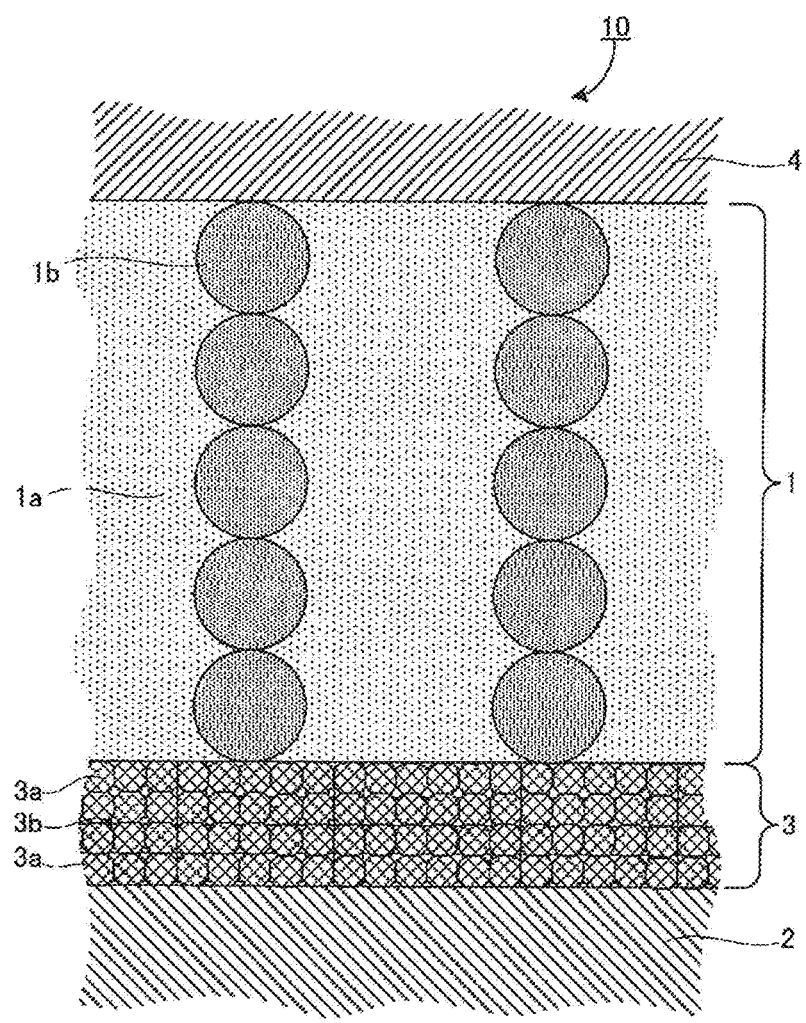
FIG. 1 is a view showing an example of the layer structure of the battery of the disclosed embodiments, and it is also a schematic sectional view in a laminating direction of the battery.

FIG. 1 is a view showing an example of the layer structure of the battery of the disclosed embodiments, and it is also a schematic sectional view in a laminating direction of the battery. For the battery of the disclosed embodiments, the thicknesses of the layers and the arrangement, form and particle diameter of the materials are not limited to those shown in FIG. 1.

A typical example 10 of the layer structure of the battery comprises a cathode 1, an anode 2 and a separator 3. The separator 3 is present between the cathode 1 and the anode 2. The typical example 10 further comprises a cathode current collector 4 on an opposite surface of the cathode 1 to a surface facing the separator 3.

The battery of the disclosed embodiments is not limited to this example. For instance, an anode current collector may be provided on an opposite surface of the anode 2 to a surface facing the separator 3.

As shown in FIG. 1, the cathode comprises an aqueous electrolyte 1a and a cathode active material 1b. The separator comprises a first oxide electrolyte sintered body 3a and a resin 3b.

Hereinafter, the components of the battery of the disclosed embodiments will be described in order.

(1) Separator

The separator comprises a first oxide electrolyte sintered body and a resin.

The first oxide electrolyte sintered body has grain boundaries between crystal particles of a garnet-type ion-conducting oxide represented by the general formula (A).

The number average particle diameter of the crystal particles is 3 μm or less.

The first oxide electrolyte sintered body satisfies the following formula 1:

$$R_{gb}/(R_b+R_{gb}) \leq 0.6 \quad \text{Formula 1}$$

As shown in FIG. 1, the separator 3 is formed with the first oxide electrolyte sintered body 3a and the resin 3b filling the voids of the first oxide electrolyte sintered body 3a. As just described, since the resin is contained in the voids of the garnet-type ion-conducting oxide represented by the general formula (A), the separator of the disclosed embodiments has a small voidage, is dense, and has desired ion conductivity.

In the disclosed embodiments, a garnet-type ion-conducting oxide in which the lithium ions are not substituted with hydrogen ions, may be referred to as "garnet-type ion-conducting oxide not subjected to substitution with hydrogen ions".

Also in the disclosed embodiments, a garnet-type ion-conducting oxide in which part of the lithium ions were substituted with hydrogen ions and which is not sintered, may be referred to as "garnet-type ion-conducting oxide subjected to substitution with hydrogen ions".

It is thought that high-temperature sintering by a solid phase flux reaction method, is needed to sinter the garnet-type ion-conducting oxide not subjected to substitution with hydrogen ions. When the oxide sintering temperature is set to high temperature (more than 900° C.), the bonding state between the crystal particles of the garnet-type ion-conducting oxide in the sintered body is excellent, and a high ion conductivity is obtained. However, there is a disadvantage that the resin is evaporated by the high temperature heating.

On the other hand, in the case of low temperature sintering that allows the resin to remain in the voids, the bonding state between the crystal particles of the garnet-type ion-conducting oxide in the sintered body is not sufficient, and the resin is left on the bonding surface of the crystal particles of the garnet-type ion-conducting oxide in the sintered body and inhibits ion conductivity. Even in the case of employing a method in which, at first, only the garnet-type ion-conducting oxide not subjected to substitution with hydrogen ions, is sintered at low temperature and then the voids are filled with the resin, the bonding state between the crystal particles of the garnet-type ion-conducting oxide in the sintered body is poor, and a low ion conductivity is obtained. Even in the case of employing a method in which the garnet-type ion-conducting oxide not subjected to substitution with hydrogen ions, is sintered at high temperature to form excellent interfaces between the crystal particles and then the voids are filled with the resin, the resin cannot completely fill the voids, and the thus-obtained separator has a high voidage.

As just described, conventional production methods cannot achieve the formation of excellent interfaces between the crystal particles; moreover, they cannot decrease the voidage of the separator thus obtained.

According to the disclosed embodiments, the melted resin is present when the garnet-type ion-conducting oxide subjected to substitution with hydrogen ions, is reacted with the Li-containing flux; therefore, an excellent bonding state can be formed between the garnet-type ion-conducting oxide particles, and the resin can successfully fill the voids formed by the evaporation of the flux. The voids formed by the evaporation of the flux are mainly composed of voids that do not largely inhibit the ion conductivity of the grain boundary triple junctions between the crystal particles of the garnet-type ion-conducting oxide. Therefore, the resin does not inhibit ion conductivity. As a result, the separator thus obtained has a high ion conductivity, a low voidage, and a dense structure that is less permeable to aqueous electrolyte.

In the technique disclosed in Patent Literature 1, the aqueous electrolyte is in contact with the anode. Accordingly, to prevent reductive decomposition of water by the anode (3 V vs. Li/Li$^+$), it is needed to prevent leakage of the aqueous electrolyte to the anode side, by the solid electrolyte (separator).

However, it is difficult for conventional techniques to block the aqueous electrolyte with the use of the solid electrolyte. The reasons are as follows. First, only the garnet-type ion-conducting oxide is known as a solid electrolyte with both water resistance and resistance to Li reduction. However, even if the garnet-type ion-conducting oxide is used as it is as the separator, the aqueous electrolyte easily penetrates the grain boundaries in the oxide. Therefore, even for the oxide, it is impossible to prevent the leakage of the aqueous electrolyte.

Meanwhile, the garnet-type ion-conducting oxide sintered body containing the resin, has a dense structure that is less permeable to the aqueous electrolyte. By using such a sintered body as the separator, the aqueous electrolyte can be separated from the anode. Therefore, the aqueous electrolyte does not reach the anode interface. Accordingly, irrespective of the type of the anode active material used, reductive decomposition of water does not occur and, as a result, the potential window of the aqueous electrolyte can be extended. In addition, excellent ion conductivity can be maintained between the cathode and the anode by the action of the first oxide electrolyte sintered body in the separator.

As just described, the battery of the disclosed embodiments in which the aqueous electrolyte is used in combination with the separator that contains the resin and the first oxide electrolyte sintered body, has better output characteristics than conventional batteries and is excellent in stability during working and storage.

From the above viewpoint, the separator may be impermeable to aqueous electrolyte.

The separator comprises the first oxide electrolyte sintered body and the resin.

The first oxide electrolyte sintered body may contain the crystal particles of the garnet-type ion-conducting oxide represented by the general formula (A) and may have the grain boundaries between the crystal particles. Also, the first oxide electrolyte sintered body may further contain a conventionally-known electrolyte material.

As an impurity, hydrogen may be contained in the composition of the first oxide electrolyte sintered body.

Hereinafter, the general formula (A) will be described in detail.

When the composition of the Li in the general formula (A) is x−3y−z>7, it is presumed that the crystal structure of the garnet-type ion-conducting oxide is changed from a cubic crystal structure to a tetragonal crystal structure, thereby impairing crystal symmetry and decreasing the lithium ion conductivity of the first oxide electrolyte sintered body.

Meanwhile, when the composition of the Li in the general formula (A) is x−3y−z<3, it is presumed that the potential of the 96h site (a specific site in which the Li in the crystal structure of the garnet-type ion-conducting oxide will be incorporated) increases and makes it difficult for the Li to be incorporated in the crystal, thereby decreasing Li occupancy and decreasing the lithium ion conductivity of the first oxide electrolyte sintered body.

As the element E, an element that is four-coordinated as with Li and has an ionic radius close to Li (Li: 0.59 Å) is used.

The garnet-type ion-conducting oxide used in the disclosed embodiments may contain, as the element E, at least one kind of element selected from the group consisting of Al, Ga, Fe and Si, at least one kind of element selected from the group consisting of Al and Ga, or an Al element.

Since the element E in the general formula (A) is contained in a range of 0≤y<0.22, the stability of the crystal structure of the garnet-type ion-conducting oxide can be increased, and the synthesis of the garnet-type ion-conducting oxide can be easy. When y is 0 or more, the stability of the crystal structure can be increased. On the other hand, when y is 0.22 or more, the particles may become too hard and affect formability.

From the viewpoint of increasing lithium ion conductivity, the viewpoint of increasing formability, and the viewpoint of densification, the element E in the general formula (A) may be contained in a range of 0≤y<0.13, or it may be contained in a range of 0≤y<0.04.

For the garnet-type ion-conducting oxide represented by the general formula (A), due to substitution of protons in a garnet-type ion-conducting oxide represented by the below-described general formula (B) (($Li_{x-3y-z}$, $E_y$, $H_z$) $L_\alpha M_\beta O_\gamma$) with Li ions in the flux, the proton content ratio z decreases. Therefore, z is in a range of 0≤z<3.4.

For the garnet-type ion-conducting oxide represented by the general formula (A), Li ion conductivity increases as z decreases. Therefore, z may be in a range of 0≤z≤0.9, or it may be 0 (z=0).

In the disclosed embodiments, the garnet-type ion-conducting oxide in which, as the element L, at least one kind of element selected from the group consisting of an alkaline-earth metal and a lanthanoid element is contained in a range of 2.5≤α≤3.5, is used. This is because the first oxide electrolyte sintered body obtains a stable crystal structure and high ion conductivity, when α in the general formula (A), which indicates the content ratio of the element L, is in a range of 2.5≤α≤3.5. In the disclosed embodiments, the alkaline-earth metal is a concept that encompasses Ca, Sr, Ba and Ra. From the viewpoint of obtaining the first oxide electrolyte sintered body with higher ion conductivity, the element L may be La. From the viewpoint of increasing the stability of the crystal structure of the first oxide electrolyte sintered body and increasing the lithium ion conductivity thereof, α may be 3 (α=3).

In the disclosed embodiments, the garnet-type ion-conducting oxide in which, as the element M, at least one kind of element selected from a transition element that can be six-coordinated with oxygen and typical elements in groups 12 to 15 of the periodic table, is contained in a range of 1.5≤β≤2.5, is used. This is because the first oxide electrolyte sintered body obtains a stable crystal structure and high ion conductivity when β in the general formula (A), which indicates the content ratio of the element M, is in a range of 1.5≤β≤2.5. From the viewpoint of increasing the stability of the crystal structure of the first oxide electrolyte sintered body and increasing the lithium ion conductivity thereof, β may be 2.

As the element M, examples include, but are not limited to, Sc, Y, Ti, Zr, Hf, V, Nb, Ta, Cr, Mo, W, Mn, Fe, Co, Ni, Cu, Zn, Cd, Al, Ga, Ge, Sn, Sb and Bi.

Of these elements, the element M may be at least one kind of element selected from the group consisting of Zr, Nb and Ta, or it may be a combination of Zr with Nb or Ta, from the point of view that the first oxide electrolyte sintered body obtains higher crystal structure stability and higher ion conductivity.

When the element M is the combination of Zr with Nb or Ta, the amount of the Zr in the composition may be in a range of from 1.4 to 1.75, and the amount of the Nb or Ta in the composition may be in a range of from 0.25 to 0.6.

In the disclosed embodiments, the garnet-type ion-conducting oxide in which γ in the general formula (A), which indicates the content ratio of oxygen O, is contained in a range of 11≤γ≤13, is used. This is because the crystal structure is unstable when γ is outside the range. From the viewpoint of stabilizing the crystal structure, γ may be 12 (γ=12).

For the separator, the number average particle diameter of the crystal particles of the garnet-type ion-conducting oxide represented by the general formula (A) may be 3 μm or less. The lower limit of the number average particle diameter is not particularly limited. From the viewpoint of handling, it may be 0.1 μm or more.

In the disclosed embodiments, the average particle diameter of the particles is calculated by a general method. An example of the method for calculating the average particle diameter of the particles is as follows. First, for a particle shown in an image taken at an appropriate magnification (e.g., 50,000× to 1,000,000×) with a transmission electron microscope (hereinafter referred to as TEM) or a scanning electron microscope (hereinafter referred to as SEM), the diameter is calculated on the assumption that the particle is spherical. Such a particle diameter calculation by TEM or SEM observation is carried out on 200 to 300 particles of the same type, and the average of the particles is determined as the average particle diameter.

The resin contained in the separator may be a thermoplastic or thermosetting resin. It may be determined depending on the intended application.

In general, thermoplastic resin has better formability than thermosetting resin. Meanwhile, thermosetting resin has better mechanical strength than thermoplastic resin.

To sufficiently spread the resin into the voids, the resin may be in such a state at the time of heating (sintering), that the resin is melted and is not yet evaporated. The resin may be a resin with a lower melting temperature and a higher thermal decomposition temperature than the heating (sintering) temperature. For example, the melting temperature of the resin may be 450° C. or less, may be 350° C. or less, or may be 300° C. or less. The thermal decomposition temperature of the resin may be 400° C. or more, may be 450° C. or more, or may be 500° C. or more.

As the resin used in the disclosed embodiments, examples include, but are not limited to, resins with excellent heat resistance, such as polyimide resin, polybenzimidazole-based thermosetting resin, and polysiloxane-based thermosetting resin.

The thickness of the separator may be 2000 μm or less, may be 1000 μm or less, may be 400 μm or less, or may be 100 μm or less. In this case, a reduction in battery size can be achieved. The lower limit of the thickness of the separator may be 10 μm or more, or may be 20 μm or more, from the viewpoint of handling.

Since the garnet-type ion-conducting oxide represented by the general formula (A) is sintered at 650° C. or less by the below-described production method, the crystal particles of the garnet-type ion-conducting oxide can be present in such a state that the number average particle diameter is smaller (3 μm or less) than the case of sintering at high temperature (e.g., 1000° C.). This is because, due to the presence of the flux, low-temperature sintering is allowed, and abnormal grain growth of the garnet-type ion-conducting oxide can be suppressed.

Therefore, if it is confirmed by a SEM image, etc., that the number average particle diameter of the crystal particles of the garnet-type ion-conducting oxide represented by the general formula (A) is 3 μm or less, the separator containing the crystal particles can be determined as a battery separator obtained by low-temperature sintering.

In the garnet-type ion-conducting oxide sintered body, the grain boundaries between the crystal particles of the garnet-type ion-conducting oxide and the inside of the crystal particles thereof conduct ions (e.g., lithium ions). Accordingly, the ion conductivity of the garnet-type ion-conducting oxide sintered body is determined based on the sum of a grain boundary resistance and an intragranular resistance (that is, the total resistance). For example, as the total resistance increases, the ion conductivity decreases. As the total resistance decreases, the ion conductivity increases. In general, it is considered that since ion conduction between the crystal particles is more difficult than ion conduction inside the crystal particles, the grain boundary resistance is large compared to the intragranular resistance. Therefore, as the ratio of the grain boundaries in the garnet-type ion-conducting oxide decreases, the ion conductivity of the oxide electrolyte sintered body increases.

For the ion conductivity inside the first oxide electrolyte sintered body, unlike the garnet-type ion-conducting oxide sintered body sintered at 1000° C. or more or the garnet-type ion-conducting oxide sintered body only subjected to proton substitution, the ratio of the grain boundary resistance is 60% or less of the total resistance (the intragranular resistance+the grain boundary resistance), that is, $R_{gb}/(R_b+R_{gb})$ ≤0.6. Therefore, the number of factors inhibiting lithium ion conduction is small, and the lithium ion conductivity of the first oxide electrolyte sintered body is high.

The ratio $R_{gb}/(R_b+R_{gb})$ of the grain boundary resistance value $R_{gb}$ with respect to the total resistance value $R_b+R_{gb}=R_{total}$ (the sum of the intragranular resistance value $R_b$ and the grain boundary resistance value $R_{gb}$) can be calculated by AC impedance measurement.

Hereinafter, an example of the method for producing the separator will be described. The separator production method is not limited to the following example.

The separator production method comprises at least the following: (a) preparing garnet-type ion-conducting oxide crystal particles, (b) preparing a flux, (c) preparing a resin, (d) forming a separator material layer, and (e) sintering. The order of the (a) to (c) is not particularly limited, and the (a) to (c) may be carried out in any order or at the same time.

(a) Preparing garnet-type ion-conducting oxide crystal particles

This is to prepare crystal particles of a garnet-type ion-conducting oxide represented by the following general formula (B):

$$(Li_{x-3y-z}E_yH_z)L_\alpha M_\beta O_\gamma$$  General Formula (B)

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x, y and z are real numbers satisfying 3≤x−3y−z≤7, 0≤y<0.22 and 0<z≤3.4; and α, β and γ are real numbers in ranges of 2.5≤α≤3.5, 1.5≤β≤2.5 and 11≤γ≤13, respectively.

The crystal particles of the garnet-type ion-conducting oxide thus prepared, are particles represented by the general formula (B) and particles subjected to substitution of part of lithium ions with hydrogen ions (0<z≤3.4 in the general formula (B)).

The composition of the general formula (B) is the same as that of the general formula (A), except that z is a real number satisfying 0<z≤3.4. When z is in a range of 0<z≤3.4, it means that hydrogen is contained.

In this preparing, commercially-available crystal particles or synthesized crystal particles may be used as the garnet-type ion-conducting oxide subjected to substitution with hydrogen ions.

In the case of synthesizing the garnet-type ion-conducting oxide subjected to substitution with hydrogen ions, for example, it can be obtained by mixing raw materials to be at a stoichiometric ratio that provides the desired garnet-type ion-conducting oxide, and heating the mixture.

As the raw materials for the garnet-type ion-conducting oxide crystal particles, conventionally-known raw materials can be used. As the raw materials, examples include, but are not limited to, $LiOH(H_2O)$, $La(OH)_3$, $Al_2O_3$, $ZrO_2$ and $Nb_2O_5$.

The method for mixing the raw materials is not particularly limited. As the mixing method, examples include, but are not limited to, a mortar, a ball mill, a jet mill and a planetary ball mill.

The heating temperature is not particularly limited, and it may be from room temperature to 1200° C.

The heating atmosphere is not particularly limited.

The heating time is not particularly limited, and it may be from 1 hour to 100 hours.

In the case of using the synthesized crystal particles, the preparing of the crystal particles of the garnet-type ion-conducting oxide subjected to substitution with hydrogen ions, may include obtaining crystal particles of a garnet-type ion-conducting oxide represented by the following general formula (C), by mixing raw materials to be at a stoichiometric ratio that provides the garnet-type ion-conducting oxide represented by the following general formula (C) and not subjected to substitution with hydrogen ions, and heating the thus-obtained mixture. Moreover, it may include obtaining the garnet-type ion-conducting oxide represented by the general formula (A) by substituting Li in the thus-obtained garnet-type ion-conducting oxide crystal particles represented by the general formula (C) with protons.

$$(Li_{x-3y}E_y)L_\alpha M_\beta O_\gamma$$ 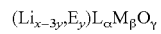 General Formula (C)

where E is at least one kind of element selected from the group consisting of Al, Ga, Fe and Si; L is at least one kind of element selected from the group consisting of an alkaline-earth metal and a lanthanoid element; M is at least one kind of element selected from a transition element that can be six-coordinated with oxygen and typical elements in groups 12 to 15 of the periodic table; x and y are real numbers satisfying $3 \leq x-3y \leq 7$ and $0 \leq y < 0.22$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively.

Compared to the garnet-type ion-conducting oxide represented by the general formula (B) $((Li_{x-3y-z}, E_y, H_z) L_\alpha M_\beta O_\gamma)$, the garnet-type ion-conducting oxide represented by the general formula (C) $((Li_{x-3y}, E_y) L_\alpha M_\beta O_\gamma)$ corresponds to a compound in which part of Li ions in the general formula (B) are not substituted with hydrogen ions. The garnet-type ion-conducting oxide represented by the general formula (C) will not be described here, since it is the same as the garnet-type ion-conducting oxide represented by the general formula (B), except that it is a garnet-type ion-conducting oxide not subjected to substitution with hydrogen ions.

As the garnet-type ion-conducting oxide represented by the general formula (C) $((Li_{x-3y}, E_y) L_\alpha M_\beta O_\gamma)$, examples include, but are not limited to, $Li_7La_3Zr_2O_{12}$, $Li_{6.4}La_3Zr_{1.4}Nb_{0.6}O_{12}$, $Li_{6.5}La_3Zr_{1.7}Nb_{0.3}O_{12}$, $Li_{6.8}La_3Zr_{1.7}Nb_{0.3}O_{12}$, $(Li_{6.2}Al_{0.2})La_3Zr_{1.7}Nb_{0.3}O_{12}$, $(Li_{5.8}Al_{0.2})La_3(Zr_{1.4}Nb_{0.6})O_{12}$, $(Li_{6.1}Al_{0.13})La_3(Zr_{1.4}Nb_{0.6})O_{12}$, $(Li_{6.3}Al_{0.02})La_3(Zr_{1.4}Nb_{0.6})O_{12}$, and $(Li_{6.2}Ga_{0.2})La_3Zr_{1.7}Nb_{0.3}O_{12}$.

In the production method of the disclosed embodiments, the method for substituting the Li ions in the garnet-type ion-conducting oxide represented by the general formula (C) with protons, is not particularly limited, as long as the garnet-type ion-conducting oxide represented by the general formula (B) $((Li_{x-3y-z}, E_y, H_z) L_\alpha M_\beta O_\gamma)$ can be obtained. From the viewpoint of easily controlling the substitution amount, for example, a powder of the garnet-type ion-conducting oxide represented by the general formula (C) may be stirred and/or immersed in pure water for several minutes to 5 days at room temperature.

The amount of hydrogen ions incorporated by the substitution can be estimated from the amounts of Li ions in the garnet-type ion-conducting oxide before and after being subjected to the substitution, which are amounts obtained by carrying out inductively-coupled plasma (ICP) analysis on the powder of the garnet-type ion-conducting oxide before and after the substitution.

That is, the hydrogen ion amount in the garnet-type ion-conducting oxide subjected to substitution with hydrogen ions, cannot be quantitated by the inductively-coupled plasma (ICP) analysis; however, the lithium ion amounts in the garnet-type ion-conducting oxide before and after substitution with hydrogen ions, can be quantitated.

Therefore, the amount of lithium ion change before and after the substitution can be calculated from the lithium ion amounts in the garnet-type ion-conducting oxide before and after the substitution. From the amount of the lithium ion change, it is possible to estimate how much lithium ions were substituted with hydrogen ions.

Also, the value of z in a sample garnet-type ion-conducting oxide, can be directly measured by use of a mass spectrometry (MS) device and a thermogravimetry (Tg) device, for example.

In general, the crystal particles of the garnet-type ion-conducting oxide prepared here are present as crystal at normal temperature. The crystal may be in a particulate form.

The number average particle diameter of the crystal particles of the garnet-type ion-conducting oxide is not particularly limited. It may be in a range of from 0.1 μm to 3 μm.

(b) Preparing Flux (Lithium Compound)

This is to prepare a lithium-containing flux.

The lithium-containing flux (a lithium compound) is not particularly limited, and it may be a flux that has a melting point at around a temperature at which hydrogen ions are desorbed from the crystal particles of the garnet-type ion-conducting oxide subjected to substitution with hydrogen ions. As the flux, examples include, but are not limited to, LiOH (melting point: 462° C.), $LiNO_3$ (melting point: 260° C.) and $Li_2SO_4$ (melting point: 859° C.). From the viewpoint of lowering the sintering temperature, the flux may be a flux with a low melting point, and it may be LiOH or $LiNO_3$. As the flux, one or more kinds of fluxes may be used.

The form of the flux may be a particulate form. When the form of the flux is a particulate form, the number average particle diameter of the flux is not particularly limited. From the viewpoint of handling, it may be in a range of from 0.1 μm to 100 μm.

(c) Preparing Resin

The details of the resin are as described above. The resin may be a resin that melts and does not thermally decompose in the below-described sintering. That is, as described above, the resin may be a resin with a lower melting temperature and a higher thermal decomposition temperature than the heating (sintering) temperature.

(d) Forming Separator Material Layer

This is to form a separator material layer comprising a mixture of the crystal particles of the garnet-type ion-conducting oxide, the flux and the resin.

In the separator material layer, the content of the crystal particles of the garnet-type ion-conducting oxide subjected to substitution with hydrogen ions, may be in a range of from 1 vol % to 99 vol %, when the total volume of the separator material layer is determined as 100 vol %.

In the separator material layer, the content of the flux may be in a range of from 1 vol % to 99 vol %, when the total volume of the separator material layer is determined as 100 vol %.

In the separator material layer, the content of the resin may be 1 vol % or more, may be 50 vol % or less, may be 25 vol % or less, or may be less than 5 vol %, when the total volume of the separator material layer is determined as 100 vol %. Also, the content of the resin in the separator material layer may be an amount that is equivalent to the amount of the flux evaporated at the time of sintering described below.

The method for mixing the flux, the resin and the crystal particles of the garnet-type ion-conducting oxide subjected to substitution with hydrogen ions, is not particularly limited. As the method, examples include, but are not limited to, a mortar, a stirrer and a homogenizer (including an ultrasonic homogenizer).

The mixing ratio of the garnet-type ion-conducting oxide subjected to substitution with hydrogen ions and the flux, is not particularly limited. It may be in a range of from 50:50 (vol %) to 95:5 (vol %), or the molar amount of the lithium in the composition of the flux may be equal to the molar amount of the hydrogen in the composition of the garnet-type ion-conducting oxide subjected to substitution with hydrogen ions.

The separator material layer may be formed after mixing the flux, the garnet-type ion-conducting oxide subjected to substitution with hydrogen ions, and the resin. From the viewpoint of forming excellent interfaces between the crystal particles of the garnet-type ion-conducting oxide represented by the general formula (A), the separator material layer may be formed as follows: the flux and the garnet-type ion-conducting oxide subjected to substitution with hydrogen ions are mixed; the mixture is applied to a substrate or the like; the applied mixture is dried to form a dry layer; and the resin is incorporated in the dry layer, thereby forming the separator material layer.

(e) Sintering

This is to sinter the separator material layer by heating at 650° C. or less.

In the disclosed embodiments, the crystal particles of the garnet-type ion-conducting oxide are bonded by a solid phase flux reaction method, using a chemical reaction between the flux material and the crystal particles of the garnet-type ion-conducting oxide subjected to substitution with hydrogen ions (a solid phase) as a driving force.

Figure 16:
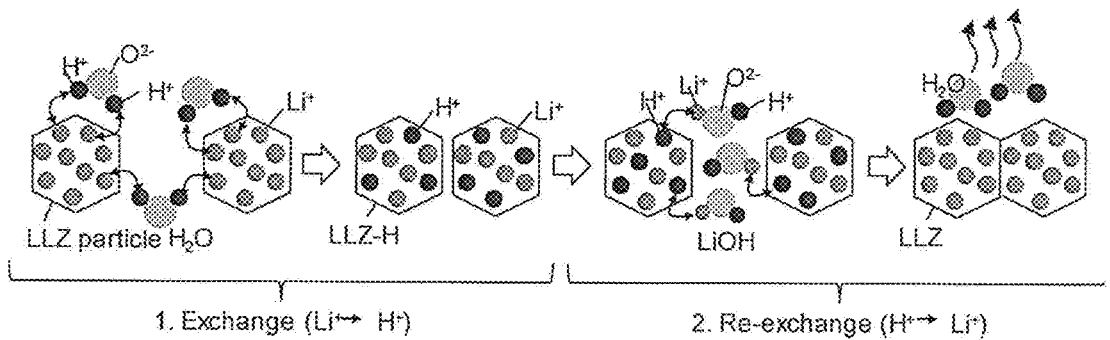
FIG. 16 is a schematic view showing the outline of a solid phase flux reaction method.

FIG. 16 is a schematic view showing the outline of the solid phase flux reaction method.

The left part ("1. Exchange ($Li^+ \rightarrow H^+$)") of FIG. 16 shows the states of the crystal particles of the garnet-type ion-conducting oxide before and after part of the lithium ions ($Li^+$) of the crystal particles are substituted with hydrogen ions ($H^+$). In FIG. 16, the garnet-type ion-conducting oxide not containing hydrogen is referred to as LLZ, and the garnet-type ion-conducting oxide containing hydrogen is referred to as LLZ-H.

The right part ("2. Re-exchange ($H^+ \rightarrow Li^+$)") of FIG. 16 shows the states of the crystal particles of the garnet-type ion-conducting oxide before and after the hydrogen ions ($H^+$) in the crystal particles of the garnet-type ion-conducting oxide are substituted with the lithium ions ($Li^+$) of the flux. When the mixture is heated to the melting point of the flux, bonding between the lithium ions ($Li^+$) and anions ($OH^-$ in FIG. 16) in the flux is weakened. At this time, the hydrogen ions ($H^+$) in the crystal particles of the garnet-type ion-conducting oxide are substituted with the lithium ions ($Li^+$) in the flux.

As shown by the right part ("2. Re-exchange ($H^+ \rightarrow Li^+$)") of FIG. 16, the lithium ions ($Li^+$) of the flux are incorporated into the crystal of the crystal particles of the garnet-type ion-conducting oxide. The hydrogen ions ($H^+$) released from the inside of the crystal of the crystal particles of the garnet-type ion-conducting oxide, bind to the anions ($OH^-$ in FIG. 16) of the flux, form a reaction product and move outside the system; therefore, they do not remain between the crystal particles of the garnet-type ion-conducting oxide represented by the general formula (A).

In the separator production method according to the disclosed embodiments, the crystal particles of the garnet-type ion-conducting oxide subjected to substitution with hydrogen ions, are mixed with the lithium-containing flux. By heating the thus-obtained mixture, the protons in the crystal particles of the garnet-type ion-conducting oxide subjected to substitution with hydrogen ions, can be resubstituted with the lithium ions in the flux. By use of the chemical reaction caused in this resubstitution, the crystal particles of the garnet-type ion-conducting oxide can be bonded at lower temperature than ever before (e.g., at 350° C.).

Also, according to the disclosed embodiments, the bonding of the crystal particles of the garnet-type ion-conducting oxide is carried out simultaneously with the curing of the resin. Therefore, the separator in which the resin is incorporated into the voids between the crystal particles of the garnet-type ion-conducting oxide represented by the general formula (A), is formed, and the voidage of the first oxide electrolyte sintered body can be decreased.

In the sintering, the upper limit of the heating temperature may be 650° C. or less, or it may be 550° C. or less. The lower limit may be equal to or more than the melting point of the flux. The heating temperature may be 350° C. or more, or it may be 400° C. or more, from the viewpoint of promoting the resubstitution of, with the lithium ions in the lithium-containing flux, the protons in the crystal particles of the garnet-type ion-conducting oxide subjected to substitution with hydrogen ions.

In the sintering, a pressure is applied at the time of heating. The pressure is not particularly limited. The heating may be carried out under an atmospheric pressure condition or higher. From the viewpoint of increasing the lithium ion conductivity of the first oxide electrolyte sintered body, the heating may be carried out under a higher pressure condition than the atmospheric pressure. At the time of heating, the upper limit of the pressure is not particularly limited. For example, it may be 6 ton/cm$^2$ (588 MPa) or less.

In the sintering, the heating atmosphere is not particularly limited.

From the viewpoint of densification of the separator, the sintering may be carried out by hot-pressing.

As used herein, the hot-pressing is a method of carrying out heating in an atmosphere-controlled furnace, with applying a pressure in a uniaxial direction.

By the hot-pressing, the first oxide electrolyte sintered body causes plastic deformation and thus densification. As a result, it is considered that the density of the first oxide electrolyte sintered body increases along with an increase in the bonding of the crystal particles inside, thereby increasing the lithium ion conductivity of the first oxide electrolyte sintered body.

For the hot-pressing temperature, the upper limit may be 650° C. or less, or it may be 550° C. or less. The lower limit may be equal to or more than the melting point of the flux. The hot-pressing temperature may be 350° C. or more, or it may be 400° C. or more, from the viewpoint of promoting the resubstitution of, with the lithium ions in the lithium-containing flux, the protons in the crystal particles of the garnet-type ion-conducting oxide subjected to substitution with hydrogen ions.

The hot-pressing pressure may be in a range of from 1 ton/cm$^2$ to 6 ton/cm$^2$ (from 98 MPa to 588 MPa).

The hot-pressing time may be in a range of from 1 minute to 600 minutes.

Hereinafter, an example of the separator production method will be described in detail.

First, the garnet-type ion-conducting oxide subjected to substitution with hydrogen ions, is immersed in a solution of the lithium-containing flux, thereby preparing a slurry.

The obtained slurry is applied to a substrate.

Then, the applied slurry is dried to solidify the flux, thereby forming the separator material layer.

The resin is applied on the separator material layer.

Then, the separator material layer is heated to cause a reaction between the flux and the garnet-type ion-conducting oxide subjected to substitution with hydrogen ions, thereby bonding the crystal particles of the garnet-type ion-conducting oxide. At this time, the resin is cured to increase the hardness of the separator material layer further and fill the voids of the first oxide electrolyte sintered body. Therefore, the separator in which the voids of the first oxide electrolyte sintered body are filled with the resin, is obtained.

According to the disclosed embodiments, the voids of the first oxide electrolyte sintered body are increased by the evaporation of the flux, and the voids are filled with the resin. Therefore, the voidage of the separator can be decreased; the separator can be densified; and desired ion conductivity can be obtained.

(2) Cathode

The cathode comprises an aqueous electrolyte and a cathode active material.

Hereinafter, the aqueous electrolyte used in the cathode will be described.

The solvent of the aqueous electrolyte contains water as the main component. That is, when the total amount of the solvent (a liquid component) constituting the aqueous electrolyte is determined as a reference (100 mol %), water may account for 50 mol % or more, 70 mol % or more, or 90 mol % or more of the total amount. On the other hand, the upper limit of the amount of water in the solvent is not particularly limited.

The solvent contains water as the main component, and it may further contain a solvent other than water. As the solvent other than water, examples include, but are not limited to, at least one solvent selected from the group consisting of ethers, carbonates, nitriles, alcohols, ketones, amines, amides, sulfur compounds and hydrocarbons. When the total amount of the solvent (the liquid component) constituting the liquid electrolyte is determined as a reference (100 mol %), the amount of the solvent other than water may be 50 mol % or less, 30 mol % or less, or 10 mol % or less.

The aqueous electrolyte used in the disclosed embodiments contains an electrolyte. As the electrolyte for the aqueous electrolyte, a conventionally-known electrolyte may be used. As the electrolyte, examples include, but are not limited to, lithium salts, nitrate salts, acetate salts and sulfate salts of imidic acid compounds, such as lithium bis(fluorosulfonyl)imide (or LiFSI, CAS No. 171611-11-3), lithium bis(trifluoromethanesulfonyl)imide (or LiTFSI, CAS No. 90076-65-6), lithium bis(pentafluoroethanesulfonyl)imide (or LiBETI, CAS No. 132843-44-8), lithium bis(nonafluorobutanesulfonyl)imide (CAS No. 119229-99-1), lithium nonafluoro-N-[(trifluoromethane)sulfonyl]butanesulfonylamide (CAS No. 176719-70-3), lithium N,N-hexafluoro-1,3-disulfonylimide (CAS No. 189217-62-7), $CH_3COOLi$, $LiPF_6$, $LiBF_4$, $Li_2SO_4$ and $LiNO_3$. Of them, the electrolyte for the aqueous electrolyte may be $Li_2SO_4$.

The concentration of the electrolyte in the aqueous electrolyte, can be appropriately determined depending on the properties of the desired battery, as long as the concentration does not exceed the saturation concentration of the electrolyte with respect to the solvent. This is because, when the electrolyte in a solid form remains in the aqueous electrolyte, it may inhibit battery reaction.

In general, as the concentration of the electrolyte in the aqueous electrolyte increases, the potential window is more extended. However, since the viscosity of the solution increases, the Li ion conductivity tends to decrease. Therefore, in general, the concentration of the electrolyte is determined depending on the properties of the desired battery, considering the Li ion conductivity and the effect of extending the potential window.

For example, in the case of using $Li_2SO_4$ as the electrolyte, the aqueous electrolyte may contain at least 1 mol, 2 mol, or 3 mol of $Li_2SO_4$ per kg of water. The upper limit is not particularly limited, and it may be 25 mol or less, for example. In the aqueous electrolyte, as the concentration of $Li_2SO_4$ increases, the reduction-side potential window of the aqueous electrolyte tends to expand.

In the case of using $Li_2SO_4$ as the electrolyte, the decomposition potential is from 4.5 V to 2.3 V (vs. Li+/Li, in the case of using a Ti foil as a current collecting foil).

The pH of the aqueous electrolyte is not particularly limited. The pH may be 3 or more, or it may be 6 or more, from the viewpoint of suppressing reductive decomposition of the water in the aqueous electrolyte by setting the reduction-side potential window of the aqueous electrolyte to 1.83 V vs. $Li/Li^+$ or less, which is said to be the thermodynamically stable range of water.

The upper limit of the pH is not particularly limited. From the viewpoint of keeping the oxidation-side potential window high, the pH may be 11 or less, or it may be 8 or less.

Hereinafter, the cathode active material used in the cathode will be described.

As the cathode active material, a conventionally-known material may be used. The cathode active material is an active material having a higher potential than the anode active material, and it is appropriately selected considering the potential window of the above-described aqueous electrolyte. For example, it may be an active material containing a Li element. More specifically, it may be an oxide or polyanion containing a Li element. As the cathode active material, examples include, but are not limited to, lithium cobaltate ($LiCoO_2$), lithium nickelate ($LiNiO_2$), lithium manganate ($LiMn_2O_4$), $LiNi_{1/3}Mn_{1/3}Co_{1/3}O_2$, a different element-substituted Li—Mn spinel represented by $Li_{1+x}Mn_{2-x-y}M_yO_4$ (where M is at least one kind of element selected from the group consisting of Al, Mg, Co, Fe, Ni and Zn), lithium titanate ($Li_xTiO_y$) that the charge-discharge potential is a noble potential compared to the anode active material, and lithium metal phosphate ($LiMPO_4$ where M is at least one kind of element selected from the group consisting of Fe, Mn, Co and Ni). Of them, the cathode active material may be $LiMn_2O_4$ (LMO). The cathode active material may be one kind of active material, or it may be a mixture of two or more kinds of active materials.

The form of the cathode active material is not particularly limited. As the form, examples include, but are not limited to, a particulate form and a plate form. When the cathode active material is in a particulate form, the primary particle diameter of the cathode active material may be 1 nm or more and 100 μm or less. The lower limit of the primary particle diameter may be 5 nm or more, may be 10 nm or more, or may be 50 nm or more. The upper limit of the primary particle diameter may be 30 μm or less, or it may be 10 μm or less.

The primary particles of the cathode active material may aggregate to form secondary particles. In this case, the particle diameter of the secondary particles is not particularly limited, and it is generally 0.5 μm or more and 50 μm or less. The lower limit of the particle diameter may be 1 μm or more, and the upper limit of the particle diameter may be 20 μm or less. When the particle diameter of the cathode active material is in such a range, the cathode active material layer can obtain excellent ion conductivity and electron conductivity.

The cathode active material may be a cathode active material covered with a second oxide electrolyte sintered body.

In this case, the second oxide electrolyte sintered body has grain boundaries between the crystal particles of the garnet-type ion-conducting oxide represented by the general formula (A); the number average particle diameter of the crystal particles of the second oxide electrolyte sintered body is 3 µm or less; and the second oxide electrolyte sintered body satisfies the formula 1 where $R_b$ is an intragranular resistance value that is an ion conductivity resistance inside the crystal particles of the second oxide electrolyte sintered body, and $R_{gb}$ is a grain boundary resistance value that is an ion conductivity resistance of the grain boundaries between the crystal particles thereof.

Figure 2:
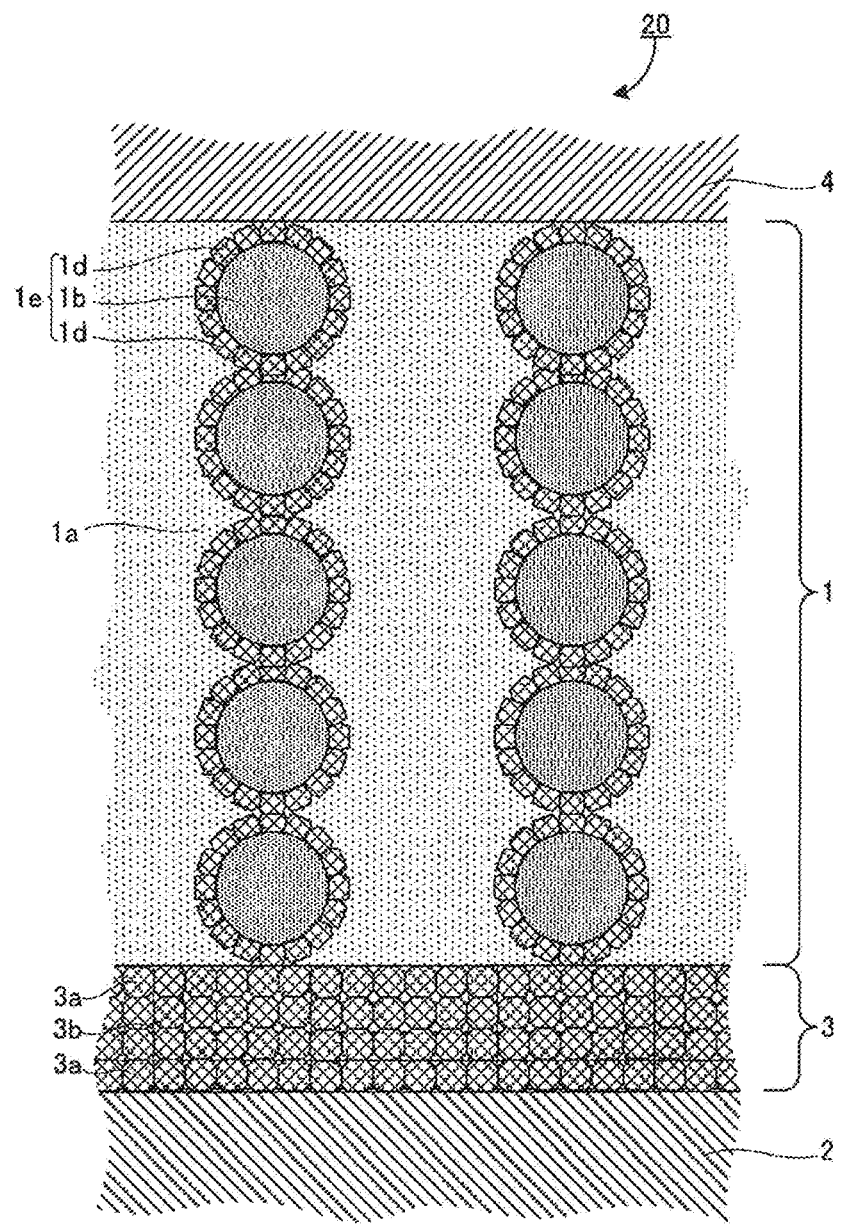
FIG. 2 is a view showing another example of the layer structure of the battery of the disclosed embodiments, and it is also a schematic sectional view in the laminating direction of the battery.

FIG. 2 is a view showing another example of the layer structure of the battery of the disclosed embodiments, and it is also a schematic sectional view in the laminating direction of the battery. A variation 20 of the layer structure of the battery is the same as the above-mentioned typical example 10 (FIG. 1), except that a covered active material 1e is used in place of the cathode active material 1b. The covered active material 1e comprises the cathode active material 1b covered with a second oxide electrolyte sintered body 1d.

Depending on the material for the cathode active material, the cathode active material and/or the aqueous electrolyte may be altered by contact with each other. Therefore, to increase the stability of the battery during working and storage, the cathode active material may be separated from the aqueous electrolyte. More specifically, as shown in FIG. 2, by covering the cathode active material 1b with the second oxide electrolyte sintered body 1d, the cathode active material 1b can be protected; oxidative decomposition of water can be prevented; and the potential window of the aqueous electrolyte can be extended. As just described, by the use of the second oxide electrolyte sintered body, the material for the cathode active material and that for the aqueous electrolyte can be selected from a wide range of materials.

When the cathode active material is covered with the second oxide electrolyte sintered body in order to prevent a reaction between the cathode active material and the aqueous electrolyte, the thickness of the covering layer and the covering state are needed be considered.

Figure 17A:
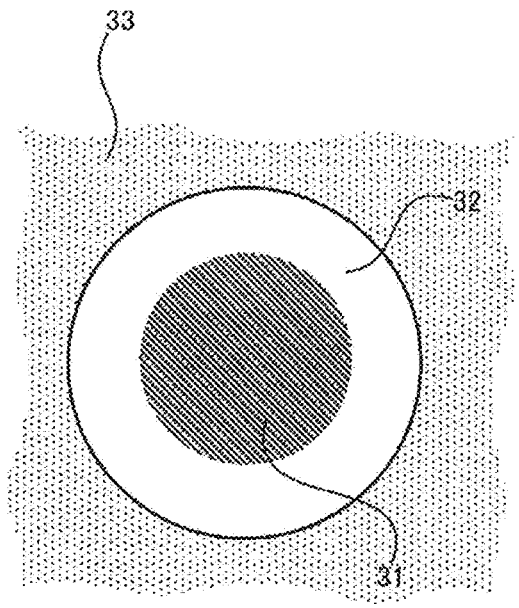
FIG. 17A is a schematic sectional view of, for a cathode active material covered with an oxide electrolyte sintered body, a case where the layer of the oxide electrolyte sintered body is thick with respect to a particle diameter of the cathode active material.
Figure 17B:
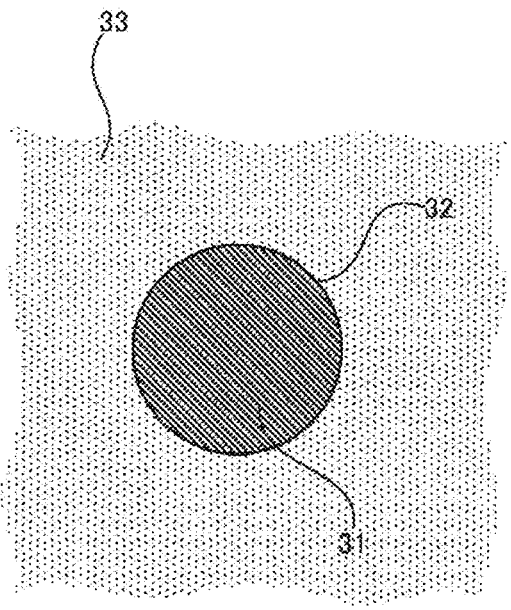
FIG. 17B is a schematic sectional view of, for a cathode active material covered with an oxide electrolyte sintered body, a case where the layer of the oxide electrolyte sintered body is thin with respect to a particle diameter of the cathode active material.

For the cathode active material covered with the second oxide electrolyte sintered body and the thickness of the covering layer, FIG. 17A is a schematic sectional view of a case where a covering layer 32 is thick with respect to the particle diameter of a cathode active material 31, and FIG. 17B is a schematic sectional view of a case where the covering layer 32 is thin with respect to the particle diameter of the cathode active material 31.

As shown in FIG. 17B, when the covering layer 32 is thin, it is difficult to maintain the thickness of the covering layer 32 constant and to check the covering layer 32. On the other hand, as shown in FIG. 17A, when the covering layer 32 is thick, it is easy to maintain the thickness of the covering layer 32 and to check the covering layer 32.

The cathode active material 31 may be covered with the covering layer 32 in such a manner that the surface of the cathode active material 31 is densely covered with the second oxide electrolyte sintered body.

For the second oxide electrolyte sintered body, the general formula (A) and the formula 1 ($R_{gb}/(R_b+R_{gb}) \le 0.6$) are as described above concerning the first oxide electrolyte sintered body.

In the grain boundaries between the crystal particles of the garnet-type ion-conducting oxide, the crystal particles are bonded in such a state that they can conduct Li ions.

In the case of a sintered body containing a prior-art garnet-type ion-conducting oxide, a temperature of 1000° C. or more is needed to bond the particles. Since particle growth is promoted at 1000° C. or more, the number average particle diameter of the particles cannot be 3 µm or less.

Meanwhile, in the case of the cathode active material covered with the second oxide electrolyte sintered body, due to sintering at a temperature of 650° C. or less, particle growth is slow, and the number average particle diameter of the crystal particles is small and is 3 µm or less.

Instead of being characterized in that the number average particle diameter of the crystal particles of the second oxide electrolyte sintered body is 3 µm or less, the battery of the disclosed embodiments may be characterized in that the lithium-containing flux is present at the grain boundary triple junctions between the crystal particles.

Figure 6:
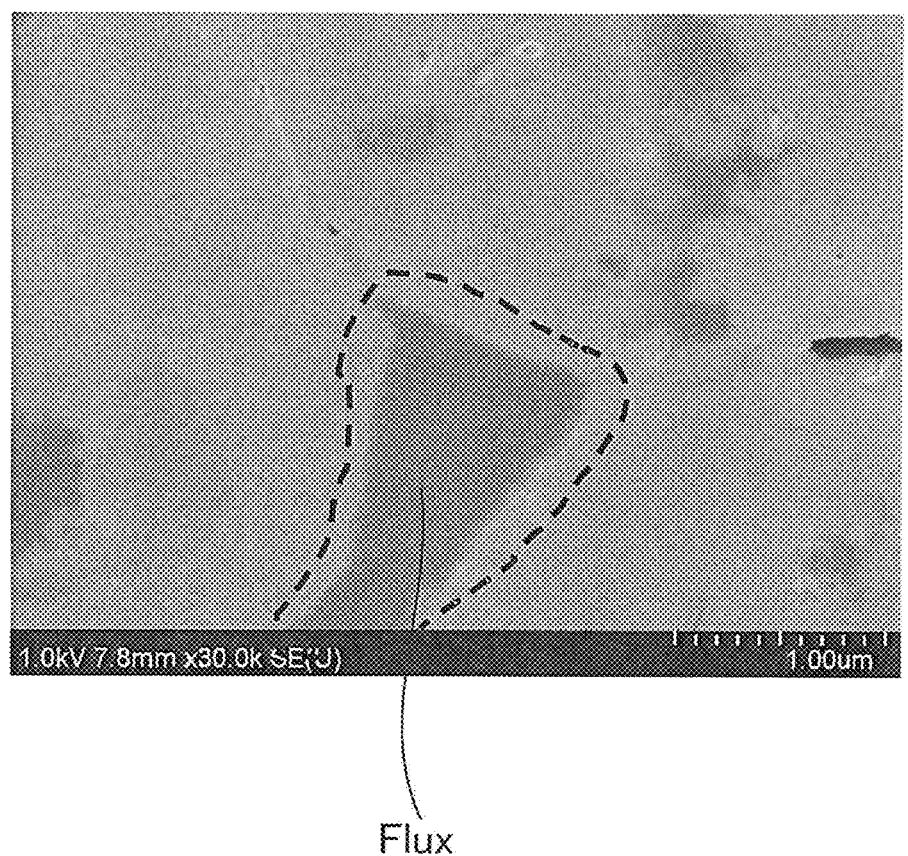
FIG. 6 is a SEM image of a grain boundary triple junction of an oxide electrolyte sintered body covering a cathode active material.

For the cathode active material covered with the second oxide electrolyte sintered body, unlike the oxide electrolyte sintered body sintered at 1000° C. or more or the oxide electrolyte sintered body subjected to proton substitution only, the lithium-containing flux is rarely present at interfaces of the particles of the crystalline oxide electrolyte. As shown in FIG. 6, the lithium-containing flux segregates to the grain boundary triple junctions (the voids between the crystal particles).

Hereinafter, the method for producing the cathode active material covered with the second oxide electrolyte sintered body (hereinafter, the method may be referred to as "covered active material production method") will be described. The covered active material production method is not limited to the method described below.

The covered material production method comprises the following: (a) preparing garnet-type ion-conducting oxide crystal particles, (b) preparing a flux, (c) preparing a cathode active material, (d) mixing the crystal particles of the garnet-type ion-conducting oxide, the flux and the cathode active material, and (e) sintering.

(a) Preparing Garnet-Type Ion-Conducting Oxide Crystal Particles

This is to prepare crystal particles of a garnet-type ion-conducting oxide represented by the following general formula (D): $(Li_{x-3y-z}, E_y, H_z) L_\alpha M_\beta O_\gamma$ (where the elements E, L and M are the same as those of the above-described general formula (A); α, β and γ are the same as those of the above-described general formula (A); and x, y and z are real numbers satisfying $3 \le x-3y-z \le 7$, $0 \le y < 0.22$ and $0.75 \le z \le 3.4$).

It is not clear why the sintering temperature can be lowered and formability during the sintering can be increased by using the mixture of the crystal particles of the garnet-type ion-conducting oxide represented by the general formula (D) and the lithium-containing flux. However, the reason can be estimated as follows from the relationship with the range of z.

First, the reason why the sintering temperature can be lowered, is as stated above in the description of FIG. 16.

Next, due to the following reason, formability cannot be increased when z in the general formula (D) is in a range of $0 \le z < 0.75$.

Figure 19:
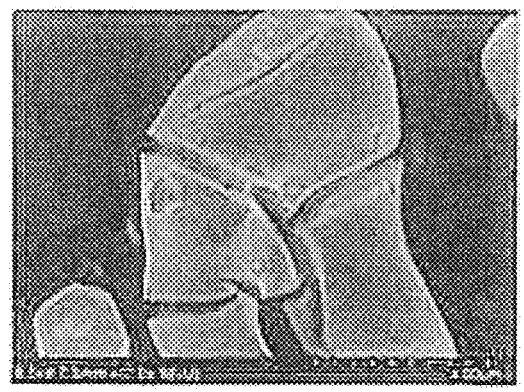
FIG. 19 is a SEM image of crystal particles of a garnet-type ion-conducting oxide represented by the composition formula $Li_7La_3Zr_2O_{12}$ and immersed in a 0.1 M HCl solution for a long time.

Crystal particles of a garnet-type ion-conducting oxide represented by the composition formula $Li_7La_3Zr_2O_{12}$, in which no proton is contained, are immersed in a 0.1 M HCl solution for a long time and observed. As a result, as shown in FIG. 19, cracking occurs in the particles at a certain point in time. The cracked plane shown in FIG. 19 is a specific crystal plane.

It is known that when the particles of the garnet-type ion-conducting oxide represented by the composition formula $Li_7La_3Zr_2O_{12}$, in which no proton is contained, are immersed in a proton-containing solution, Li ions in the particles of the garnet-type ion-conducting oxide are substituted with protons. For the garnet-type ion-conducting oxide represented by the composition formula $Li_7La_3Zr_2O_{12}$, it is also known that the crystal structure cannot be retained when the amount of Li ions substituted with protons exceeds a certain amount.

Due to these reasons, the reason why, as shown in FIG. 19, cracking occurs along the specific crystal plane of the particles, is presumed to be because the crystal structure cannot be retained along the crystal plane since the amount of Li ions substituted with protons on the specific crystal plane exceeds a certain amount.

In the environment where, like the below-described sintering, it is possible to substitute protons in the garnet-type ion-conducting oxide crystal particles with Li ions, bonding between Li ions or protons and other constitutional elements is temporarily cut. If load is applied to the crystal particles in this state, it is presumed that the specific crystal plane of the particles in which exchange of Li ions and protons is occurring, slips to cause plastic deformation, while the crystal structure is retained.

For the garnet-type ion-conducting oxide crystal particles represented by the general formula (D) where z is in a range of $0 \leq z < 0.75$, protons are present on the particle surface. However, since the proton content of the specific crystal plane is small, it is thought that the crystal plane is likely to slip during the sintering, and formability cannot be increased.

Meanwhile, in the garnet-type ion-conducting oxide crystal particles represented by the general formula (D) where z is in a range of $0.75 \leq z \leq 3.4$, which are used in the covered active material production method, protons are present not only on the surface but also in the above-specified crystal plane. Therefore, it is thought that when the protons present in the specific crystal plane of the particles are resubstituted with the Li in the flux during the sintering, the crystal plane is likely to slip and, as a result, formability is increased.

Figure 18:
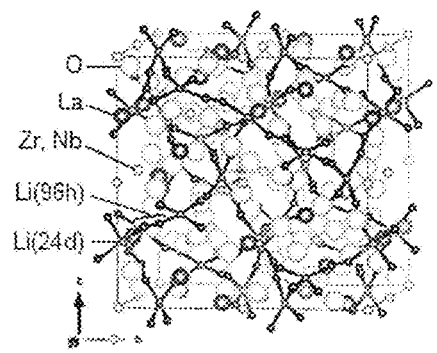
FIG. 18 is a schematic view showing Li sites in crystal particles of a garnet-type ion-conducting oxide.

As shown in FIG. 18, in the crystal structure of a garnet oxide electrolyte, Li ions are present in 24$d$ and 96$h$ sites. In the disclosed embodiment, a garnet oxide electrolyte in which the Li sites are substituted with a specific amount of element E or protons, is used.

Such a garnet-type ion-conducting oxide is used herein, that the value of x−3y−z which is obtained from the composition ratio of the Li, element E and protons in the 24$d$ and 96$h$ sites shown in FIG. 18, is in a range of $3 \leq x-3y-z \leq 7$. In the case of x−3y−z>7, it is possible that the crystal structure of the garnet-type ion-conducting oxide is changed from a cubic crystal structure to a tetragonal crystal structure, thereby impairing crystal symmetry and decreasing Li ion conductivity. When the composition of the Li in the general formula is x−3y−z<3, it is possible that the potential of the 96h site (a specific site in which the Li in the crystal structure of the garnet oxide electrolyte will be incorporated) increases and makes it difficult for the Li to be incorporated in the crystal, thereby decreasing Li occupancy and decreasing Li ion conductivity.

The garnet-type ion-conducting oxide represented by the general formula (D) where z (the amount of Li ions substituted with protons) is in a range of $0.75 \leq z \leq 3.4$, is used herein. This is because, as described above, when z in the general formula (D) is in the range of $0.75 \leq z \leq 3.4$, formability can be increased without changing the crystal structure largely.

From the viewpoint of increasing formability, z may be in a range of $0.8 \leq z \leq 3.4$ or in a range of $0.91 \leq z \leq 3.4$.

The method for measuring z in the general formula (D), which indicates the amount of Li ions substituted with protons, is not particularly limited, and it may be a known method. The method for measuring z is as described above.

The garnet-type ion-conducting oxide represented by the general formula (D) which is present as crystals at normal temperature and which is in a particulate form, is used herein.

The average particle diameter of the crystal particles of the garnet-type ion-conducting oxide represented by the general formula (D) is not particularly limited. It may be in a range of from 0.1 μm to 100 μm, or in a range of from 0.2 μm to 3 μm.

As the garnet-type ion-conducting oxide represented by the general formula (D), commercially-available crystal particles or synthesized crystal particles may be used.

In the case of using the synthesized crystal particles, the preparing of the crystal particles of the garnet-type ion-conducting oxide represented by the general formula (D), may include obtaining crystal particles of a garnet-type ion-conducting oxide represented by the general formula (C), by mixing raw materials to be at a stoichiometric ratio that provides the garnet-type ion-conducting oxide represented by the above-described general formula (C) and heating the mixture. Moreover, it may include obtaining the garnet-type ion-conducting oxide represented by the general formula (D) by substituting Li in the thus-obtained garnet-type ion-conducting oxide crystal particles represented by the general formula (C) with protons.

(b) Preparing Flux

This is the same as the preparing of the flux in the above-described separator production method.

(c) Preparing Cathode Active Material

The cathode active material used in the disclosed embodiments may be a cathode active material that is usable in a Li ion battery.

As the cathode active material, examples include, but are not limited to, $LiMn_2O_4$, $LiFePO_4$, $LiCoO_2$ and $Li(Ni,Co,Al)O_2$.

(d) Mixing Crystal Particles of Garnet-Type Ion-Conducting Oxide, Flux and Cathode Active Material This is to mix the crystal particles of the garnet-type ion-conducting oxide represented by the general formula (D), the Li-containing flux, and the cathode active material.

The method for mixing the crystal particles of the garnet-type ion-conducting oxide, the flux and the cathode active material, is not particularly limited and may be a known method.

The order of mixing the crystal particles of the garnet-type ion-conducting oxide, the flux and the cathode active material, is not particularly limited. For example, a solution of the flux may be mixed with the crystal particles of the garnet-type ion-conducting oxide and the cathode active material and then dried. Or, the crystal particles of the garnet-type ion-conducting oxide and the flux may be mixed to obtain a complex, and then the complex may be mixed with the cathode active material.

The complex of the crystal particles of the garnet-type ion-conducting oxide and the flux, is not particularly limited. For example, it may be a complex in which the crystal particles of the garnet-type ion-conducting oxide and the flux are uniformly mixed, or it may be a complex in which the surface of the crystal particles of the garnet-type ion-conducting oxide is covered with the flux.

The mixing ratio of the crystal particles of the garnet-type ion-conducting oxide and the flux, is not particularly limited, and it may be in a range of from 50:50 (vol %) to 95:5 (vol %), since the desired oxide electrolyte sintered body can be efficiently obtained.

The mixing ratio of the crystal particles of the garnet-type ion-conducting oxide and the cathode active material is not particularly limited, and it may be in a range of from 50:50 (vol %) to 95:5 (vol %) to densely cover the surface of the cathode active material.

(e) Sintering

This is to sinter the mixture of the crystal particles of the garnet-type ion-conducting oxide represented by the general formula (D), the Li-containing flux and the cathode active material, by heating at a temperature of 650° C. or less.

According to the disclosed embodiments, by the use of the crystal particles of the garnet-type ion-conducting oxide represented by the general formula (D) and the Li-containing flux, the crystal particles of the garnet-type ion-conducting oxide can be sintered even at a lower temperature than ever before (e.g., 350° C.) and allows plastic deformation. Therefore, the cathode active material which is covered with the oxide electrolyte sintered body having high Li ion conductivity and which has high coverage, can be obtained.

The crystal particles of the garnet-type ion-conducting oxide has high chemical stability at a temperature of 650° C. or less; therefore, a reaction with the cathode active material can be suppressed. In the sintering, therefore, the upper limit of the sintering temperature is 650° C. or less. From the viewpoint of further suppressing a reaction between the crystal particles of the garnet-type ion-conducting oxide and the cathode active material, the sintering temperature may be 550° C. or less.

The lower limit of the sintering temperature may be equal to or less than the melting point of the flux. From the viewpoint of promoting the substitution of the protons in the garnet-type ion-conducting oxide crystal particles represented by the general formula (D) with the Li ions in the flux and thus increasing the bonding between the particles and formability, the sintering temperature may be 350° C. or more, or may be 400° C. or more.

Detailed sintering conditions are the same as those of the sintering in the above-described separator production method.

Figure 7:
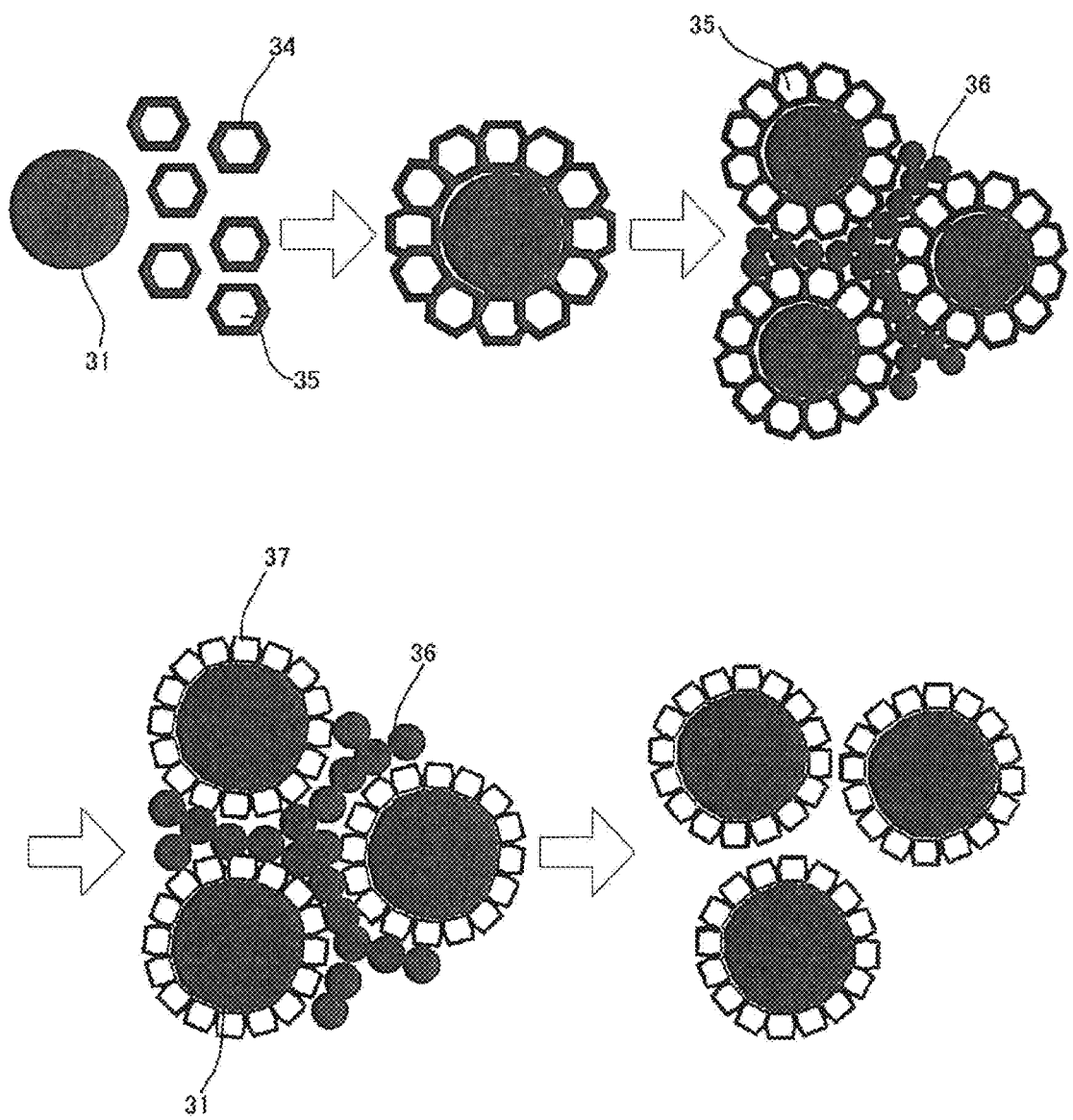
FIG. 7 is a schematic view of an example of a method for producing a covered active material.

An example of the covered active material production method will be described with reference to FIG. 7.

First, a cathode active material 31 and crystal particles 35 of a garnet-type ion-conducting oxide are prepared, the oxide being represented by the general formula (D) and coated with a Li-containing flux 34. Next, using a dry particle composing machine, the surface of the active material is covered with the crystal particles of the garnet-type ion-conducting oxide represented by the general formula (D) and coated with the flux. A removable component such as a carbon 36 is added thereto, and they are mixed to obtain a mixture. The mixture is kneaded and then pressed. In this state, the pressed product is heated at a temperature of 650° C. or less to promote bonding and deformation of the crystal particles by an ion exchange reaction (an exchange reaction of Li ions and protons) caused between the crystal particles of the garnet-type ion-conducting oxide that is represented by the general formula (D) and coated with the Li-containing flux. Finally, the carbon is removed therefrom by heating under an oxygen atmosphere, thereby obtaining the cathode active material covered with a second oxide electrolyte sintered body 37.

The amount of the cathode active material contained in the cathode is not particularly limited. For example, when the whole cathode is determined as a reference (100 mass %), the cathode active material may be 10 mass % or more, may be 20 mass % or more, or may be 40 mass % or more. The upper limit is not particularly limited, and it may be 99 mass % or less, may be 97 mass % or less, or may be 95 mass % or less. When the content of the cathode active material is in such a range, the cathode active material layer can obtain excellent ion conductivity and electron conductivity.

In addition to the aqueous electrolyte and the cathode active material, the cathode may further contain materials for the cathode. As the materials for the cathode, examples include, but are not limited to, a conductive additive and a binder.

The conductive additive can be selected from conductive additives that are generally used in batteries. More specifically, it may be a conductive additive that contains a carbonaceous material selected from Ketjen Black (KB), vapor-grown carbon fiber (VGCF), Acetylene Black (AB), carbon nanotube (CNT) and carbon nanofiber (CNF).

Also, a metal material with tolerance to the environment where the battery is used, may be used.

The conductive additive may be one kind of conductive additive, or it may be a mixture of two or more kinds of conductive additives.

The form of the conductive additive may be selected from various kinds of forms such as a powder form and a fiber form.

The amount of the conductive additive contained in the cathode is not particularly limited. For example, when the whole cathode is determined as a reference (100 mass %), the conductive additive may be 0.1 mass % or more, may be 0.5 mass % or more, or may be 1 mass % or more. The upper limit is not particularly limited, and it may be 50 mass % or less, may be 30 mass % or less, or may be 10 mass % or less. When the content of the conductive additive is in such a range, the cathode can obtain excellent ion conductivity and electron conductivity.

The binder can be selected from binders that are generally used in batteries, such as styrene-butadiene rubber (SBR), carboxymethyl cellulose (CMC), acrylonitrile-butadiene rubber (ABR), butadiene rubber (BR), polyvinylidene fluoride (PVDF) and polytetrafluoroethylene (PTFE).

The binder may be one kind of binder, or it may be a mixture of two or more kinds of binders.

The amount of the binder contained in the cathode is not particularly limited. For example, when the whole cathode is determined as a reference (100 mass %), the binder may be 0.1 mass % or more, may be 0.5 mass % or more, or may be 1 mass % or more. The upper limit is not particularly limited, and it may be 50 mass % or less, may be 30 mass % or less, or may be 10 mass % or less. When the content of the binder is in such a range, the cathode can obtain excellent ion conductivity and electron conductivity.

The amount of the cathode mixture containing the cathode active material (as needed, it may further contain the conductive additive and the binder) is not particularly limited. For example, it may be in a range of 1 mg/cm$^2$ to 50 mg/cm$^2$.

The thickness of the cathode is not particularly limited. For example, it may be 0.1 μm or more and 1 mm or less, or may be 1 μm or more and 100 μm or less.

A cathode current collector functions to collect current from the cathode active material layer. As the material for the cathode current collector, examples include, but are not limited to, a metal material containing at least one element selected from the group consisting of Ni, Al, Au, Pt, Fe, Ti, Co and Cr. As long as the surface of the cathode current collector is composed of this material, the inside of the cathode current collector may be composed of a different material. Also, Ti or SUS may be used as the cathode current collector.

As the form of the cathode current collector, examples include, but are not limited to, various kinds of forms such as a foil form, a plate form, a mesh form and a perforated metal form.

The cathode may further comprise a cathode lead connected to the cathode current collector.

(3) Anode

The anode generally comprises an anode active material layer and an anode current collector for collecting current from the anode active material layer.

The anode active material layer contains at least an anode active material. As needed, it contains a conductive additive and a binder.

The anode may be free from aqueous electrolyte, from the viewpoint of increasing the output characteristics of the battery and increasing the stability of the battery during working and storage.

As the anode active material, examples include, but are not limited to, a Li metal, sulfur, materials mainly containing a sulfur element, $TiS_2$, $Mo_6S_8$ chevrel, titanium oxides such as $Li_4Ti_5O_{12}$ (LTO) and $TiO_2$, materials that can form an alloy with Li (such as Si and Sn) and metal-organic frameworks (MOFs). Of them, the anode active material may be a Li metal.

The amount of the anode active material contained in the anode active material layer is not particularly limited. For example, when the whole anode active material layer is determined as a reference (100 mass %), the anode active material may be 10 mass % or more, may be 20 mass % or more, or may be 40 mass % or more. The upper limit is not particularly limited, and it may be 99 mass % or less, may be 95 mass % or less, or may be 90 mass % or less. When the content of the anode active material is in such a range, the anode active material layer can obtain excellent ion conductivity and electron conductivity.

The conductive additive and the binder are the same as those of the above-described cathode.

As the material for the anode current collector, examples include, but are not limited to, at least one metal material selected from the group consisting of Al, Zn, Sn, Ni, SUS and Cu. As long as the surface of the anode current collector is composed of the material, the inside of the anode current collector may be composed of a different material. From the viewpoint of resistance to Li reduction, Ni or SUS may be used as the anode current collector.

As the form of the anode current collector, examples include, but are not limited to, a foil form, a plate form, a mesh form, a perforated metal form and a foam form.

2. Battery Production Method

Under a high temperature condition, a reaction is caused between the cathode active material and a conventional garnet-type ion-conducting oxide. Therefore, integral sintering of the two materials is needed to be carried out under a low temperature condition. However, conventional garnet-type ion-conducting oxides cannot be sufficiently sintered under a low temperature condition.

Hereinafter, based on the low-temperature sintering properties of the garnet-type ion-conducting oxide represented by the general formula (B), a battery production method using integral sintering of the cathode active material and the oxide, will be described.

Figure 3A:
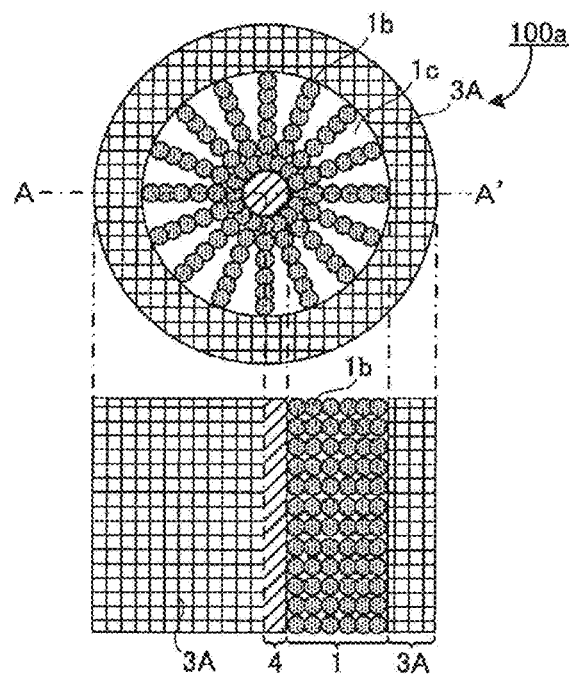
FIG. 3A shows schematic full- and half-sectional views of an intermediate 100a of a cylindrical battery.
Figure 3B:
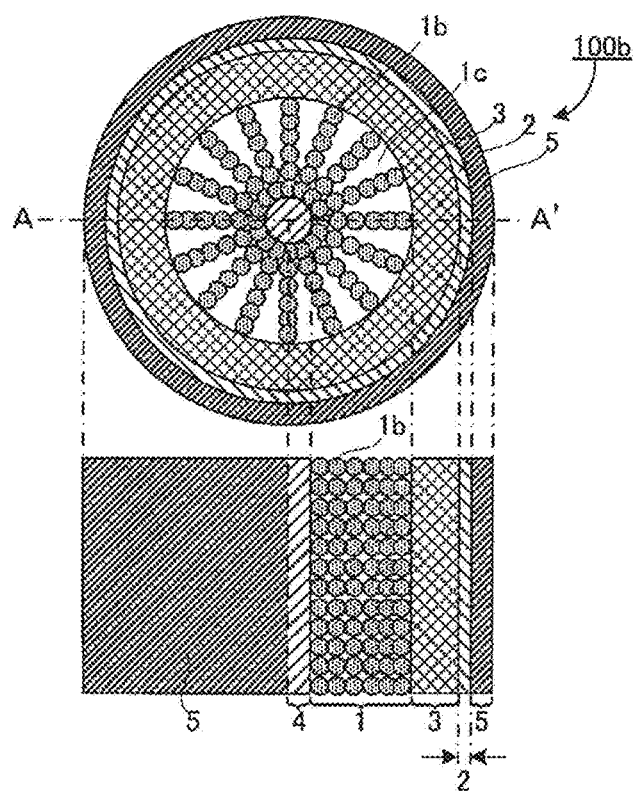
FIG. 3B shows schematic full- and half-sectional views of an intermediate 100b of a cylindrical battery.
Figure 3C:
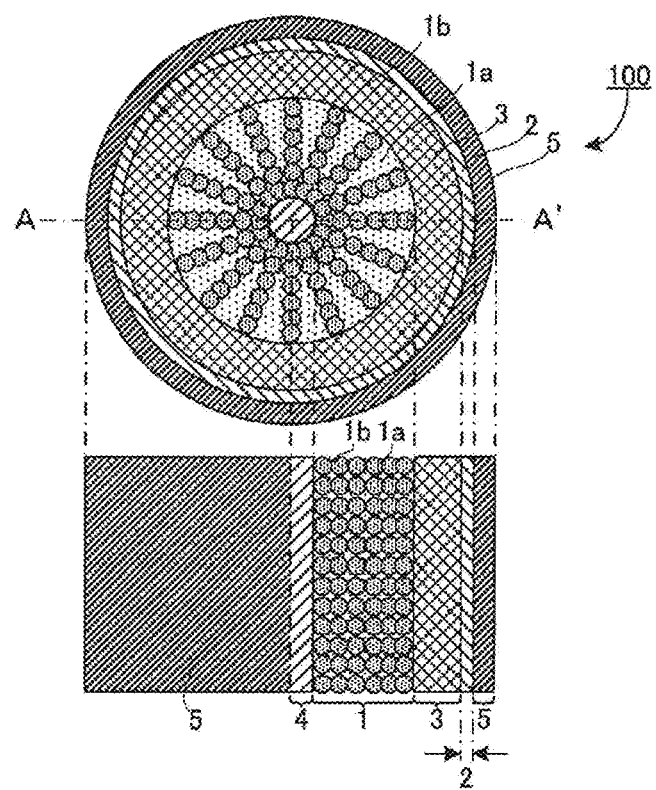
FIG. 3C shows schematic full- and half-sectional views of a cylindrical battery 100.

FIGS. 3A to 3C are figures for illustrating an example of the method for producing a cylindrical battery (the first embodiment of the battery). Symbols shown in these figures correspond to the symbols in FIGS. 1 and 2. However, for the sake of simplicity, the internal structure of the separator 3 as shown in FIGS. 1 and 2, are not shown in FIGS. 3A to 3C (and also in FIGS. 4A to 5C). FIGS. 3A to 3C shows the cathode active material 1b that is not covered with an electrolyte. In place of the cathode active material 1b, the covered active material 1e shown in FIG. 2 or a precursor thereof may be used.

The upper part of FIG. 3A is a schematic view of an intermediate 100a of the cylindrical battery, and it is also a sectional view in the vertical direction to the central axis of the cylinder. The lower part of FIG. 3A is also a schematic view of the intermediate 100a of the cylindrical battery, and it is a half-sectional view in the parallel direction to the central axis of the cylinder. Especially, the right side of the half-sectional view corresponds to a view of the intermediate 100a cut by a plane which includes an alternate long and short dash line A-A' shown in the upper part of FIG. 3A and which is in a direction vertical to the sheet surface. The relationship between the full- and half-sectional views also applies to FIGS. 3B to 4B.

As shown in FIG. 3A, the intermediate 100a is such that the rod-shaped cathode current collector 4 is the center; the cathode active material 1b is disposed around the cathode current collector; and the separator material layer 3A is wound therearound. In addition to the cathode active material 1b, a void 1c for storing the aqueous electrolyte is provided between the cathode current collector 4 and the separator material layer 3A. The method for producing the separator material layer 3A conforms to the descriptions of "(d) Forming separator material layer" in the above-mentioned separator production method.

The separator material layer 3A is a layer containing the crystal particles of the garnet-type ion-conducting oxide represented by the general formula (B), the flux and the resin. By sintering the intermediate 100a at low temperature (for example, sintering at a temperature of 650° C. or less), the separator material layer 3A is converted into the separator 3. Also, since the intermediate 100a is sintered under the low temperature condition, even if the cathode current collector 4, the cathode active material 1b and the separator material layer 3A are integrally sintered, there is no possibility of a reaction between the cathode active material 1b and the crystal particles of the garnet-type ion-conducting oxide in the separator material layer 3A.

When a precursor of the covered active material 1e (FIG. 2) is used in the structure of FIG. 3A in place of the cathode active material 1b, the precursor is converted into the covered active material 1e by low-temperature sintering. In this case, there is no possibility of a reaction between the cathode active material 1b in the precursor and the crystal particles of the garnet-type ion-conducting oxide represented by the general formula (D) in the precursor and/or the crystal particles of the garnet-type ion-conducting oxide represented by the general formula (B) in the separator material layer 3A.

FIG. 3B shows schematic full- and half-sectional views of an intermediate 100b of the cylindrical battery. The intermediate 100b corresponds to an intermediate obtained by subjecting the intermediate 100a to integral sintering, and then winding the anode 2 and the anode current collector 5 in this order around the intermediate.

FIG. 3C shows schematic full- and half-sectional views of a cylindrical battery 100. The cylindrical battery 100 is completed by injecting the aqueous electrolyte 1a into the void 1c in the intermediate 100b.

As just described, in the production method shown in FIGS. 3A to 3C, the production process is short and simple. Moreover, in the thus-obtained cylindrical battery 100, it is easy to prevent a short circuit that is caused by leakage of the aqueous electrolyte 1a. In addition, since the cathode current collector 4 and the cathode active material 1b are housed in the cylinder in advance, compared to a production method in which these materials are housed in the cylinder in a later stage (see the below-described FIGS. 4A and 4B), the width of the cathode 1 (that is, the distance between the cathode current collector 4 and the separator 3) can be freely designed on the micron to centimeter scale.

Figure 4A:
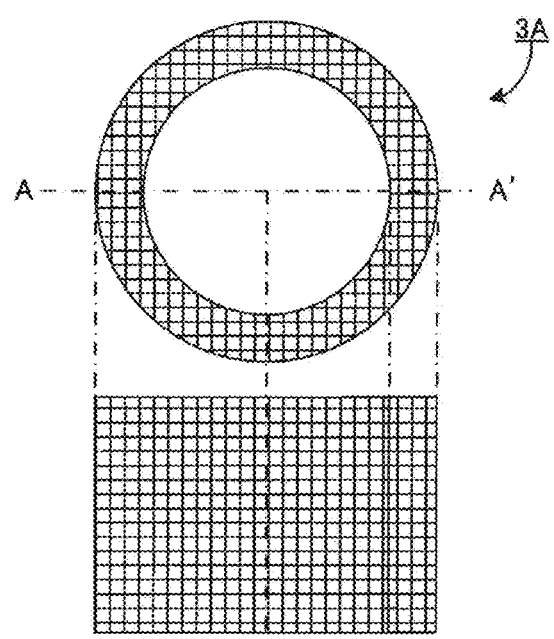
FIG. 4A shows schematic full- and half-sectional views of a cylindrical separator material layer 3A.
Figure 4B:
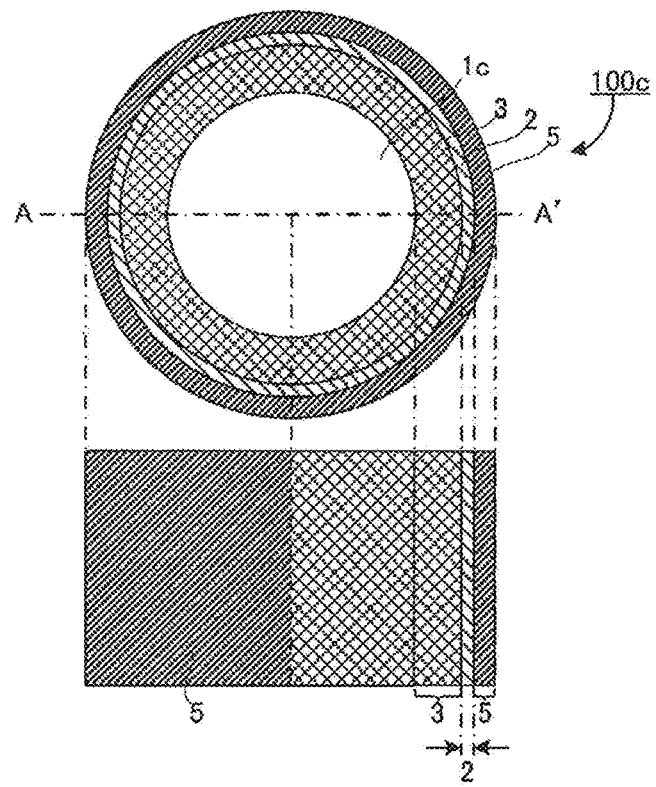
FIG. 4B shows schematic full- and half-sectional views of an intermediate 100c of a cylindrical battery.

FIGS. 4A and 4B are figures for illustrating another example of the method for producing the cylindrical battery (the first embodiment of the battery). Symbols in these figures correspond to the symbols in FIGS. 1 to 3C.

FIG. 4A shows schematic full- and half-sectional views of the cylindrical separator material layer 3A.

FIG. 4B shows schematic full- and half-sectional views of an intermediate 100c of the cylindrical battery. The intermediate 100c corresponds to an intermediate obtained by sintering the separator material layer 3A shown in FIG. 4A and then winding the anode 2 and the anode current collector 5 in this order around the thus-obtained separator 3. Also, the separator 3 may be produced by sintering a cylindrical garnet-type ion-conducting oxide, pouring a resin thereinto, and then curing the resin by heating.

The cylindrical battery 100 is completed by adding the cathode active material 1b to the void 1c of the intermediate 100c, inserting the rod-shaped cathode current collector 4 in the center, and finally injecting the aqueous electrolyte 1a (FIG. 3C).

In the case of undergoing the process shown in FIGS. 4A and 4B, depending on the materials used, sintering is needed to be carried out two or more times. Therefore, the process is long compared to the production method in which integral sintering is used (FIGS. 3A to 3C). Moreover, since the addition of the cathode active material 1b and the insertion of the cathode current collector 4 are carried out in a later stage, the pore diameter of the separator material layer 3A is needed to be at least several millimeters. Therefore, the width of the obtained cathode 1 (that is, the distance between the cathode current collector 4 and the separator 3) is limited.

Figure 5A:
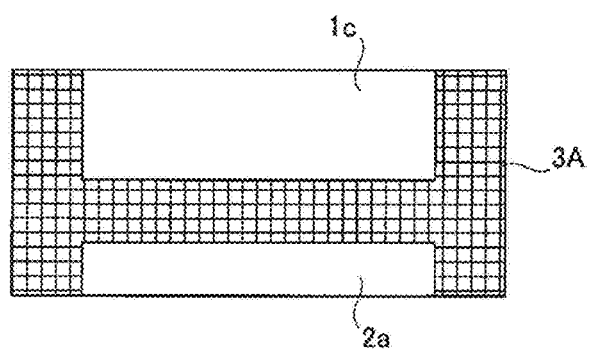
FIG. 5A is a schematic sectional view of the separator material layer 3A.
Figure 5B:
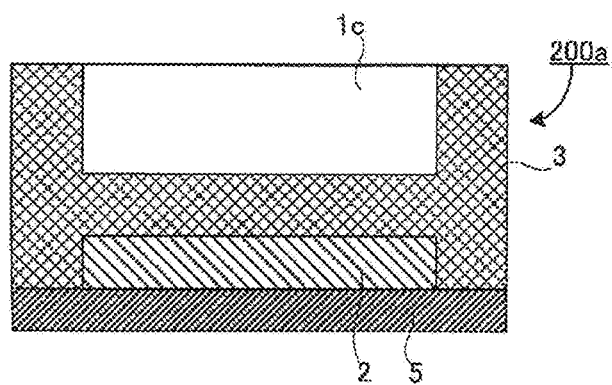
FIG. 5B is a schematic sectional view of an intermediate 200a of a flat battery.
Figure 5C:
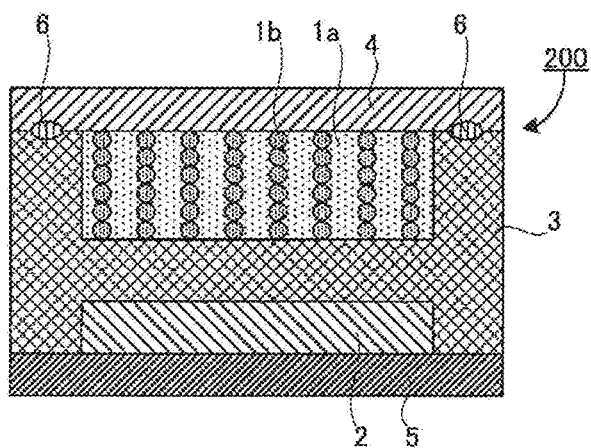
FIG. 5C is a schematic sectional view of a flat battery 200.

FIGS. 5A to 5C are figures for illustrating an example of the method for producing a flat battery (the second embodiment of the battery). Symbols in these figures correspond to the symbols in FIGS. 1 and 2.

FIG. 5A is a schematic sectional view of the separator material layer 3A. The separator material layer 3A is provided with the void 1c for disposing the cathode and a void 2a for disposing the anode.

FIG. 5B is a schematic sectional view of an intermediate 200a of a flat battery. The intermediate 200a corresponds to an intermediate obtained by sintering the separator material layer 3A shown in FIG. 5A and then disposing the anode 2 and the anode current collector 5 in this order in the void 2a of the thus-obtained separator 3. Also, the separator 3 may be produced by sintering a flat garnet-type ion-conducting oxide, pouring a resin thereinto, and then curing the resin by heating.

FIG. 5C is a schematic sectional view of a flat battery 200. The flat battery 200 corresponds to a battery obtained by adding the aqueous electrolyte 1a and the cathode active material 1b to the void 1c of the intermediate 200a, capping the void 1c by the cathode current collector 4, and then providing a sealing 6 for leakage prevention. The cathode active material 1b shown in FIG. 5C is not covered with an electrolyte; however, the covered active material 1e shown in FIG. 2 may be used in place of the cathode active material 1b.

A flat battery is obtained by the production method shown in FIGS. 5A to 5C. In this production method, depending on the material(s) used, sintering is needed to be carried out two or more times. Therefore, the process is long compared to the case where integral sintering can be used. In the case of the flat battery, unlike the case of the cylindrical battery, a solid electrolyte may be further needed in addition to the separator 3, in order to prevent a short circuit caused by the leakage of the aqueous electrolyte.

EXAMPLES

Hereinafter, the disclosed embodiments will be explained in detail, by way of examples. The disclosed embodiments are not limited to the following examples.

1. Separator (1) Production of Garnet-Type Ion-Conducting Oxide Sintered Body

Reference Experimental Example A1

[Synthesis of Garnet-Type Ion-Conducting Oxide]

Stoichiometric amounts of LiOH($H_2O$) (manufactured by Sigma-Aldrich), La(OH)$_3$ (manufactured by Kojundo Chemical Laboratory Co., Ltd.), ZrO$_2$ (manufactured by Kojundo Chemical Laboratory Co., Ltd.) and Nb$_2$O$_5$ (manufactured by Kojundo Chemical Laboratory Co., Ltd.) were used as starting raw materials and mixed to obtain a mixture.

The mixture and a flux (NaCl) were heated from room temperature to 950° C. for 8 hours and then kept at 950° C. for 20 hours, thereby obtaining crystal particles of a garnet-type ion-conducting oxide not subjected to substitution with hydrogen ions, the oxide having the composition of $Li_{6.8}La_3Zr_{1.7}Nb_{0.3}O_{12}$.

[Substitution with Hydrogen Ions]

Then, at room temperature, 2 g of the thus-obtained crystal particles of the garnet-type ion-conducting oxide not subjected to substitution with hydrogen ions, were immersed in pure water (200 ml) for several minutes to substitute part of lithium ions with hydrogen ions, thereby obtaining the crystal particles of the garnet-type ion-conducting oxide subjected to substitution with hydrogen ions, the oxide having the composition of $Li_{5.4}H_{1.4}La_3Zr_{1.7}Nb_{0.3}O_{12}$. In the composition of the garnet-type ion-conducting oxide, the amount of Li substituted with H was 1.4.

The crystal particles of the garnet-type ion-conducting oxide were subjected to ICP analysis before and after the substitution with hydrogen ions. From the amount of change in the lithium element in the composition of the garnet-type ion-conducting oxide before and after being subjected to the substitution with hydrogen ions, the amount of hydrogen ions incorporated by the substitution was estimated. Then, the composition of the garnet-type ion-conducting oxide crystal particles subjected to substitution with hydrogen ions, was estimated.

[Sintering (Resubstitution)]

The $Li_{5.4}H_{1.4}La_3Zr_{1.7}Nb_{0.3}O_{12}$ crystal particles subjected to substitution with hydrogen ions and a powder of LiNO$_3$ were weighed in a volume ratio of 75:25. Then, they were dry-mixed in a mortar to obtain a mixed powder. The mixed powder was pressed at room temperature (load: 1 ton/cm$^2$ (98 MPa)) to obtain a pressed powder. The pressed powder was heated at 500° C. for 20 hours under a normal pressure condition, thereby obtaining a garnet-type ion-conducting oxide sintered body.

Reference Experimental Example A2

A garnet-type ion-conducting oxide sintered body was produced in the same manner as Reference Experimental Example A1, except that in the sintering, the pressed powder was heated at 400° C. for 12 hours under a pressure condition (load: 1 ton/cm$^2$ (≈98 MPa)) to obtain the sintered body.

Reference Experimental Example A3

A garnet-type ion-conducting oxide sintered body was produced in the same manner as Reference Experimental Example A1, except that LiOH was used as the flux, and then the sintering was carried out.

Reference Experimental Example A4

A garnet-type ion-conducting oxide sintered body was produced in the same manner as Reference Experimental Example A1, except that crystal particles of $Li_{6.8}La_3Zr_{1.7}Nb_{0.3}O_{12}$ not subjected to substitution with hydrogen ions, were sintered without being subjected to substitution with hydrogen ions.

Reference Experimental Example A5

A garnet-type ion-conducting oxide sintered body was produced in the same manner as Reference Experimental Example A1, except the following points.

Crystal particles of a garnet-type ion-conducting oxide subjected to substitution with hydrogen ions, the oxide having the composition of $Li_{3.0}H_{2.8}Al_{0.2}La_3Zr_{1.4}Nb_{0.6}O_{12}$, were prepared.

The crystal particles of the garnet-type ion-conducting oxide subjected to substitution with hydrogen ions, the oxide having the composition of $Li_{3.0}H_{2.8}Al_{0.2}La_3Zr_{1.4}Nb_{0.6}O_{12}$, and a powder of $LiNO_3$ were weighed so that the amount of the $LiNO_3$ powder was 1.1 times (3.08 $LiNO_3$) the amount of H (2.8) in the composition $(Li_{3.0}H_{2.8}Al_{0.2}La_3Zr_{1.4}Nb_{0.6}O_{12})$ of the garnet-type ion-conducting oxide subjected to substitution with hydrogen ions. Then, the crystal particles and the $LiNO_3$ powder were dry-mixed in a mortar to obtain a mixed powder. The mixed powder was hot-pressed under conditions of 400° C. and 1 ton/cm$^2$ for 480 minutes, thereby obtaining a garnet-type ion-conducting oxide sintered body.

[Lithium Ion Conductivity]

Lithium ion conductivity measurement was carried out on the garnet-type ion-conducting oxide sintered bodies produced in Reference Experimental Examples A1 to A5. Their lithium ion conductivities were measured by an AC impedance measurement method, with the use of POTENTIOSTAT 1470 (product name, manufactured by Solartron) and IMPEDANCE ANALYZER FRA1255B (product name, manufactured by Solartron) and under conditions of a voltage swing of 25 mV, a measurement frequency (F) of from 0.1 Hz to 1 MHz, a measurement temperature of 25° C., and normal pressure.

For the garnet-type ion-conducting oxide sintered bodies produced in Reference Experimental Examples A1 to A5, the lithium ion conductivities are as follows: $8.0 \times 10^{-6}$ S/cm in Reference Experimental Example A1, $1.1 \times 10^{-4}$ S/cm in Reference Experimental Example A2, $8.0 \times 10^{-5}$ S/cm in Reference Experimental Example A3, $9.0 \times 10^{-7}$ S/cm in Reference Experimental Example A4, and $4.7 \times 10^{-5}$ S/cm in Reference Experimental Example A5.

[AC Impedance Measurement]

From the results of the AC impedance measurement, the ratio $R_{gb}/(R_b+R_{gb}=R_{total})$ of the grain boundary resistance value $R_{gb}$ with respect to the total resistance value $R_b+R_{gb}=R_{total}$ (the sum of the intragranular resistance value $R_b$ and the grain boundary resistance value $R_{gb}$) was calculated for each of the garnet-type ion-conducting oxide sintered bodies produced in Reference Experimental Examples A1 to A5.

For the garnet-type ion-conducting oxide sintered bodies of Reference Experimental Examples A1 to A5, the values of $R_{gb}/(R_b+R_{gb}=R_{total})$ are as follows: 0.60 in Reference Experimental Example A1, 0.55 in Reference Experimental Example A2, 0.40 in Reference Experimental Example A3, 0.95 in Reference Experimental Example A4, and 0.44 in Reference Experimental Example A5.

The arc endpoint frequencies ($H_z$), which indicate a grain boundary resistance component, are as follows: 1000 Hz in Reference Experimental Examples A1 to A3 and A5, and 100 Hz in Reference Experimental Example A4.

A reason for the higher lithium ion conductivities of Reference Experimental Examples A1 to A3 and A5 than the lithium ion conductivity of Reference Experimental Example A4, is because the ratio $R_{gb}/(R_b+R_{gb}=R_{total})$ of the grain boundary resistance value $R_{gb}$ with respect to the total resistance value $R_{total}$ is as low as 0.6 or less.

The reason for the low grain boundary resistance ratios is presumed as follows: since the arc endpoint frequencies ($H_z$) differ, which indicate the grain boundary resistances, the states of the grain boundaries of the oxide electrolyte sintered bodies of Reference Experimental Examples A1 to A3 and A5, differ from Reference Experimental Example A4.

Therefore, it is presumed that in the case of the separator containing the oxide electrolyte sintered body used in the disclosed embodiments, the ratio $R_{gb}/(R_b+R_{gb}=R_{total})$ of the garnet-type ion-conducting oxide sintered body contained in the separator, satisfies the condition of 0.6 or less.

Reference Experimental Example A6

Crystal particles of a garnet-type ion-conducting oxide not subjected to substitution with hydrogen ions, the oxide having the composition of $Li_{6.4}La_3Zr_{1.4}Nb_{0.6}O_{12}$, were obtained in the same manner as Reference Experimental Example A1.

At room temperature, 2.0 g of the thus-obtained crystal particles of the garnet-type ion-conducting oxide not subjected to substitution with hydrogen ions, were immersed in pure water (500 mL) for 48 hours to substitute part of Li ions with hydrogen ions, thereby obtaining the crystal particles of the garnet-type ion-conducting oxide subjected to substitution with hydrogen ions, the oxide having the composition of $Li_{3.0}H_{3.4}La_3Zr_{1.4}Nb_{0.6}O_{12}$.

Therefore, it is clear that the garnet-type ion-conducting oxide subjected to substitution with hydrogen ions is obtained, in which the hydrogen (H) content ratio z in the general formula (B) is 3.4.

It is thought that if the resin is present at the time of sintering in Reference Experimental Examples A1 to A3 and A5, the resin enters voids formed at the time of sintering, and the voids are filled with the resin. Therefore, the separator of the disclosed embodiments is presumed to have a low voidage and excellent ion conductivity.

Reference Experimental Example A7

Crystal particles of a garnet-type ion-conducting oxide not subjected to substitution with hydrogen ions, the oxide having the composition of $Li_{6.4}La_3Zr_{1.4}Nb_{0.6}O_{12}$, were obtained in the same manner as Reference Experimental Example A1.

For the crystal particles of the garnet-type ion-conducting oxide not subjected to substitution with hydrogen ions, the number average particle diameter was 2.8 μm.

Figure 8:
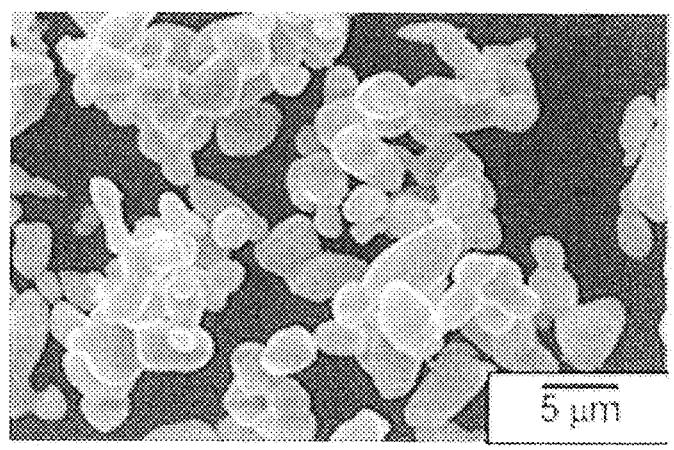
FIG. 8 is a SEM image of crystal particles of a garnet-type ion-conducting oxide not subjected to substitution with hydrogen ions of Reference Experimental Example A7.

FIG. 8 is a SEM image of the thus-obtained crystal particles of the garnet-type ion-conducting oxide not subjected to substitution with hydrogen ions.

[Substitution with Hydrogen Ions]

Then, at room temperature, 2 g of the thus-obtained crystal particles of the garnet-type ion-conducting oxide not subjected to substitution with hydrogen ions, were immersed in pure water (200 ml) for several minutes to substitute, with hydrogen ions, part of the lithium ions of the garnet-type ion-conducting oxide not subjected to substitution with hydrogen ions, thereby obtaining the crystal particles of the garnet-type ion-conducting oxide subjected to substitution with hydrogen ions, the oxide having the composition of $Li_{5.5}H_{0.9}La_3Zr_{1.4}Nb_{0.6}O_{12}$.

[Sintering (Resubstitution)]

The $Li_{5.5}H_{0.9}La_3Zr_{1.4}Nb_{0.6}O_{12}$ crystal particles subjected to substitution with hydrogen ions and 0.9 mol of LiOH were dry-mixed in a mortar to obtain a mixed powder.

The amount of the flux was controlled so that the amount of the flux and the amount of hydrogen were at a stoichiometric ratio of 1:1.

The number average particle diameter of the LiOH was 5 μm.

As a solvent, 2-butanol was added to the mixed powder. A green sheet was produced.

The thus-obtained green sheet was heated at 400° C. for 8 hours in an argon atmosphere under a normal pressure condition, thereby obtaining a garnet-type ion-conducting oxide sintered body.

Figure 9:
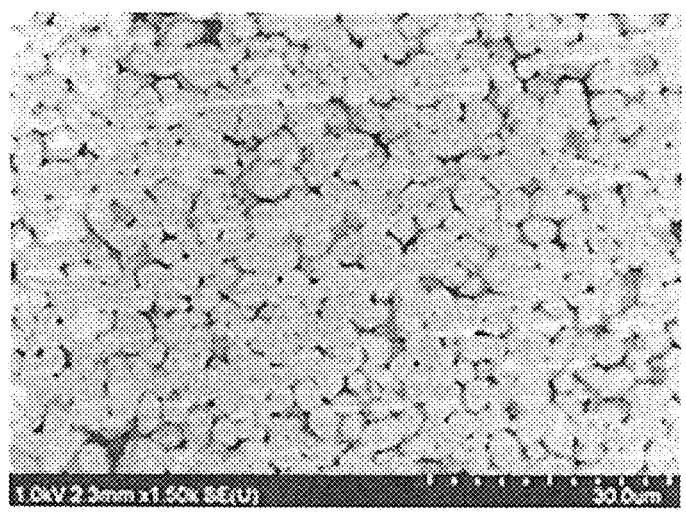
FIG. 9 is a SEM image of a garnet-type ion-conducting oxide sintered body of Reference Experimental Example A7.

FIG. 9 is a SEM image of the garnet-type ion-conducting oxide sintered body obtained by heating.

From FIG. 9, the following facts are found: there are grain boundaries between the crystal particles; the number average particle diameter of the crystal particles is 3 μm or less; and the form of the crystal particles is retained.

2. Covered Active Material (1) Examination of Oxide Electrolyte Sintered Body Used as Covering Layer An oxide electrolyte sintered body was produced as a sample for property evaluation and examined and examined if it can be used to cover the cathode active material.

a. Production of Oxide Electrolyte Sintered Body

Reference Experimental Example B1

[Preparing Garnet-Type Ion-Conducting Oxide Crystal Particles]

To obtain garnet-type ion-conducting oxide crystal particles having the composition of $Li_{6.75}La_3Zr_{1.4}Nb_{0.6}O_{12}$, as starting raw materials, stoichiometric amounts of LiOH (H₂O) (manufactured by Sigma-Aldrich), La(OH)₃ (manufactured by Kojundo Chemical Laboratory Co., Ltd.), ZrO₂ (manufactured by Kojundo Chemical Laboratory Co., Ltd.) and Nb₂O₅ (manufactured by Kojundo Chemical Laboratory Co., Ltd.) were weighed and mixed to obtain a mixture.

The mixture and a flux (NaCl) were heated from room temperature to 950° C. for 8 hours and kept at 950° C. for 20 hours so that the mixture melted in the flux was 2.5 mol %, thereby obtaining the garnet-type ion-conducting oxide crystal particles having the composition of $Li_{6.75}La_3Zr_{1.4}Nb_{0.6}O_{12}$. The number average particle diameter of the thus-obtained crystal particles was 2.8 μm.

At room temperature, 2.0 g of the thus-obtained garnet-type ion-conducting oxide crystal particles, were immersed in pure water (100 mL) for 60 minutes to substitute Li ions with protons, thereby obtaining garnet-type ion-conducting oxide crystal particles for Reference Experimental Example B1.

The crystal particles were subjected to ICP analysis before and after the substitution. As a result, it was found that the Li ion content ratio was 6.75 before the substitution and 6.00 before the substitution. Therefore, it was thought that in the composition of the garnet-type ion-conducting oxide, the amount of Li substituted with H is 0.75.

From the above results, it is clear that the garnet-type ion-conducting oxide particles for Reference Experimental Example B1 has the composition of $Li_{6.0}H_{0.75}La_3Zr_{1.4}Nb_{0.6}O_{12}$.

[Preparing Flux]

LiNO₃ having a melting point of 260° C. was used as a flux.

[Mixing of Garnet-Type Ion-Conducting Oxide Crystal Particles and Flux]

The thus-prepared garnet-type ion-conducting oxide crystal particles and the LiNO₃ (powder) were weighed at a volume ratio of 75:25 and dry-mixed in a mortar, thereby obtaining a complex of the garnet-type ion-conducting oxide crystal particles for Reference Experimental Example B1 and the flux.

[Sintering]

The thus-obtained complex of the garnet-type ion-conducting oxide crystal particles and the flux was pressed at room temperature (load: 1 ton/cm² (≈98 MPa)) to obtain a pressed powder. The pressed powder was hot-pressed (temperature: 400° C., load: 3.2 ton/cm² (≈313 MPa), time: 4 hours) to obtain an oxide electrolyte sintered body of Reference Experimental Example B1.

Reference Experimental Example B2

A complex of a flux and garnet-type ion-conducting oxide crystal particles for Reference Experimental Example B2, and an oxide electrolyte sintered body of Reference Experimental Example B2 were obtained in the same manner as Reference Experimental Example B1, except that the garnet-type ion-conducting oxide crystal particles were prepared as follows.

The garnet-type ion-conducting oxide crystal particles were obtained in the same manner as Reference Experimental Example B1, which had the composition of $Li_{6.4}La_3Zr_{1.4}Nb_{0.6}O_{12}$ and a number average particle diameter of 2.8 μm.

At room temperature, 2.0 g of the thus-obtained garnet-type ion-conducting oxide crystal particles were immersed in pure water (200 mL) for 60 minutes to substitute part of Li ions with hydrogen ions, thereby obtaining the garnet-type ion-conducting oxide crystal particles for Reference Experimental Example B2.

In the same manner as Reference Experimental Example B1, the crystal particles were subjected to ICP analysis before and after the substitution with hydrogen ions. As a result, it was found that the garnet-type ion-conducting oxide crystal particles for Reference Experimental Example B2 has the composition of $Li_{5.6}H_{0.80}La_3Zr_{1.4}Nb_{0.6}O_{12}$.

Reference Experimental Example B3

A complex of a flux and garnet-type ion-conducting oxide crystal particles for Reference Experimental Example B3, and an oxide electrolyte sintered body of Reference Experimental Example B3, were obtained in the same manner as Reference Experimental Example B1, except that the garnet-type ion-conducting oxide crystal particles were prepared as follows.

The garnet-type ion-conducting oxide crystal particles were obtained in the same manner as Reference Experimental Example B1, which had the composition of $Li_{6.4}La_3Zr_{1.4}Nb_{0.6}O_{12}$ and a number average particle diameter of 2.8 μm.

At room temperature, 2.0 g of the thus-obtained garnet-type ion-conducting oxide crystal particles were immersed in pure water (300 mL) for 60 minutes to substitute part of Li ions with hydrogen ions, thereby obtaining the garnet-type ion-conducting oxide crystal particles for Reference Experimental Example B3.

In the same manner as Reference Experimental Example B1, the crystal particles were subjected to ICP analysis before and after the substitution with hydrogen ions. As a result, it was found that the garnet-type ion-conducting oxide crystal particles for Reference Experimental Example B3 has the composition of $Li_{5.48}H_{0.91}La_3Zr_{1.4}Nb_{0.6}O_{12}$.

Reference Experimental Example B4

A complex of a flux and garnet-type ion-conducting oxide crystal particles for Reference Experimental Example B4, and an oxide electrolyte sintered body of Reference Experimental Example B4, were obtained in the same manner as Reference Experimental Example B1, except that the garnet-type ion-conducting oxide crystal particles were prepared as follows.

The garnet-type ion-conducting oxide crystal particles were obtained in the same manner as Reference Experimental Example B1, which had the composition of $Li_{6.4}La_3Zr_{1.4}Nb_{0.6}O_{12}$ and a number average particle diameter of 2.8 μm.

At room temperature, 2.0 g of the thus-obtained garnet-type ion-conducting oxide crystal particles were immersed in pure water (400 mL) for 60 minutes to substitute part of Li ions with hydrogen ions, thereby obtaining the garnet-type ion-conducting oxide crystal particles for Reference Experimental Example B4.

In the same manner as Reference Experimental Example B1, the crystal particles were subjected to ICP analysis before and after the substitution with hydrogen ions. As a result, it was found that the garnet-type ion-conducting oxide crystal particles for Reference Experimental Example B4 has the composition of $Li_{4.6}H_{1.8}La_3Zr_{1.4}Nb_{0.6}O_{12}$.

Reference Experimental Example B5

A complex of a flux and garnet-type ion-conducting oxide crystal particles for Reference Experimental Example B5, and an oxide electrolyte sintered body of Reference Experimental Example B5, were obtained in the same manner as Reference Experimental Example B1, except that the garnet-type ion-conducting oxide particles were prepared as follows.

The garnet-type ion-conducting oxide particles were obtained in the same manner as Reference Experimental Example B1, which had the composition of $Li_{6.4}La_3Zr_{1.4}Nb_{0.6}O_{12}$ and a number average particle diameter of 2.8 μm.

At room temperature, 2.0 g of the thus-obtained garnet-type ion-conducting oxide crystal particles were immersed in pure water (500 mL) for 48 hours to substitute part of Li ions with hydrogen ions, thereby obtaining the garnet-type ion-conducting oxide crystal particles for Reference Experimental Example B5.

In the same manner as Reference Experimental Example B1, the crystal particles were subjected to ICP analysis before and after the substitution with hydrogen ions. As a result, it was found that the garnet-type ion-conducting oxide particles for Reference Experimental Example B5 has the composition of $Li_{3.0}H_{3.4}La_3Zr_{1.4}Nb_{0.6}O_{12}$.

Reference Comparative Example B1

A complex of a flux and garnet-type ion-conducting oxide crystal particles for Reference Comparative Example B1, and an oxide electrolyte sintered body of Reference Comparative Example B1, were obtained in the same manner as Reference Experimental Example B1, except that the garnet-type ion-conducting oxide crystal particles were prepared as follows.

The garnet-type ion-conducting oxide crystal particles were obtained in the same manner as Reference Experimental Example B1, which had the composition of $Li_{6.4}La_3Zr_{1.4}Nb_{0.6}O_{12}$. The thus-obtained garnet-type ion-conducting oxide crystal particles were used as they were, as the garnet-type ion-conducting oxide crystal particles of Reference Comparative Example B1, and they were not subjected to substitution with hydrogen.

Reference Comparative Example B2

A complex of a flux and garnet-type ion-conducting oxide crystal particles for Reference Comparative Example B2, and an oxide electrolyte sintered body of Reference Comparative Example B2, were obtained in the same manner as Reference Experimental Example B1, except that the garnet-type ion-conducting oxide crystal particles were prepared as follows.

The garnet-type ion-conducting oxide crystal particles were obtained in the same manner as Reference Experimental Example B1, which had the composition of $Li_{6.4}La_3Zr_{1.4}Nb_{0.6}O_{12}$ and a number average particle diameter of 2.8 μm.

At room temperature, 2.0 g of the thus-obtained garnet-type ion-conducting oxide crystal particles were immersed in pure water (50 mL) for 30 minutes to substitute part of Li ions with hydrogen ions, thereby obtaining the garnet-type ion-conducting oxide crystal particles for Reference Comparative Example B2.

In the same manner as Reference Experimental Example B1, the crystal particles were subjected to ICP analysis before and after the substitution with hydrogen ions. As a result, it was found that the garnet-type ion-conducting oxide crystal particles of Reference Comparative Example B2 has the composition of $Li_{6.27}H_{0.13}La_3Zr_{1.4}Nb_{0.6}O_{12}$.

Reference Comparative Example B3

A complex of a flux and garnet-type ion-conducting oxide crystal particles for Reference Comparative Example B3, and an oxide electrolyte sintered body of Reference Comparative Example B3, were obtained in the same manner as Reference Experimental Example B1, except that the garnet-type ion-conducting oxide crystal particles were prepared as follows.

The garnet-type ion-conducting oxide crystal particles were obtained in the same manner as Reference Experimental Example B1, which had the composition of $Li_{6.4}La_3Zr_{1.4}Nb_{0.6}O_{12}$ and a number average particle diameter of 2.8 μm.

At room temperature, 2.0 g of the thus-obtained garnet-type ion-conducting oxide crystal particles were immersed in pure water (100 mL) for 60 minutes to substitute part of Li ions with hydrogen ions, thereby obtaining the garnet-type ion-conducting oxide crystal particles for Reference Comparative Example B3.

In the same manner as Reference Experimental Example B1, the crystal particles were subjected to ICP analysis before and after the substitution with hydrogen ions. As a result, it was found that the garnet-type ion-conducting oxide crystal particles for Reference Comparative Example B3 has the composition of $Li_{6.0}H_{0.4}La_3Zr_{1.4}Nb_{0.6}O_{12}$.

(b) Evaluation of Oxide Electrolytes Sintered Bodies
(b-1) Measurement of Relative Density For each of the oxide electrolyte sintered bodies of Reference Experimental Examples B1 to B5 and Reference Comparative Examples B1 to B3, the density was measured. Then, the relative density in the case where the true density of a general garnet oxide, which is 5.10 g/cm$^3$, is determined as 100%, was calculated.

It can be evaluated that as the relative density increases, the oxide electrolyte easily causes plastic deformation and has high formability.

(b-2) Electron Microscopy Observation

SEM observation was carried out on the surfaces of the oxide electrolyte sintered bodies of Reference Experimental Examples B1 to B5 and Reference Comparative Examples B1 to B3.

The SEM observation was carried out to evaluate the degree of plastic deformation of the particle form and to calculate the number average particle diameter of the crystal particles in the oxide electrolyte sintered body.

(b-3) X-Ray Crystal Diffraction (XRD)

To evaluate crystallinity, X-ray crystal diffraction was carried out on the oxide electrolyte sintered bodies of Reference Experimental Examples B1 to B5 and Reference Comparative Examples B1 to B3.

(b-4) Measurement of Lithium Ion Conductivity

Lithium ion conductivity measurement was carried out on the oxide electrolyte sintered bodies produced in Reference Experimental Examples B1 to B5 and Reference Comparative Examples B1 to B3. Their lithium ion conductivities were measured by an AC impedance measurement method, with the use of POTENTIOSTAT 1470 (product name, manufactured by Solartron) and IMPEDANCE ANALYZER FRA1255B (product name, manufactured by Solartron) and under conditions of a voltage swing of 25 mV, a measurement frequency (F) of from 0.1 Hz to 1 MHz, a measurement temperature of 25° C., and normal pressure.

From the results of the AC impedance measurement, the ratio $R_{gb}/(R_b+R_{gb}=R_{total})$ of the grain boundary resistance value $R_{gb}$ with respect to the total resistance value $R_b+R_{gb}=R_{total}$ (the sum of the intragranular resistance value $R_b$ and the grain boundary resistance value $R_{gb}$) was calculated for each of the oxide electrolyte sintered bodies produced in Reference Experimental Examples B1 to B5 and Reference Comparative Examples B1 to B3.

Figure 10:
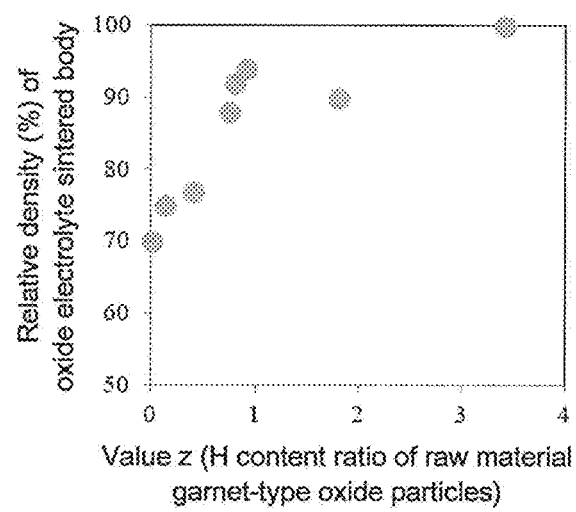
FIG. 10 is a graph showing a relationship between a hydrogen (H) content ratio z of crystal particles of a garnet-type ion-conducting oxide and a relative density of an oxide electrolyte sintered body thus obtained.

Table 1 shows the properties of the garnet-type oxide electrolyte crystal particles used and the evaluation results of the oxide electrolyte sintered bodies. FIG. 10 shows a relationship between the hydrogen (H) content ratio z of the garnet-type oxide electrolyte crystal particles represented by the general formula (D) $(Li_{x-3y-z}, E_y, H_z) L_\alpha M_\beta O_\gamma$, which were used as a raw material, and the relative density of the oxide electrolyte sintered body thus obtained.

TABLE 1

| | Composition of raw materials | H content ratio | Relative density | Particle deformation | Crystallinity | Li ion conductivity (S/cm) | Average particle diameter (μm) | $R_{gb}/(R_b + R_{gb})$ |
|---|---|---|---|---|---|---|---|---|
| Reference Comparative Example B1 | $Li_{6.4}La_3Zr_{1.4}Nb_{0.6}O_{12}$ | 0 | 70 | No | Maintained | 1.00E−06 | 2.8 | 0.99 |
| Reference Comparative Example B2 | $Li_{6.27}H_{0.13}La_3Zr_{1.4}Nb_{0.6}O_{12}$ | 0.13 | 75 | No | Maintained | 6.80E−05 | 2.8 | 0.45 |
| Reference Comparative Example B3 | $Li_{6.0}H_{0.4}La_3Zr_{1.4}Nb_{0.6}O_{12}$ | 0.4 | 77 | No | Maintained | 8.00E−05 | 2.8 | 0.4 |
| Reference Experimental Example B1 | $Li_{8.6}H_{0.75}La_3Zr_{1.4}Nb_{0.6}O_{12}$ | 0.75 | 88 | Yes | Maintained | 1.00E−04 | 2.8 | 0.28 |
| Reference Experimental Example B2 | $Li_{5.6}H_{0.8}La_3Zr_{1.4}Nb_{0.6}O_{12}$ | 0.8 | 92 | Yes | Maintained | 2.00E−04 | 2.8 | 0.2 |
| Reference Experimental Example B3 | $Li_{5.48}H_{0.91}La_3Zr_{1.4}Nb_{0.6}O_{12}$ | 0.91 | 94 | Yes | Maintained | 3.60E−04 | 2.8 | 0.18 |
| Reference Experimental Example B4 | $Li_{4.6}H_{1.8}La_3Zr_{1.4}Nb_{0.6}O_{12}$ | 1.8 | 90 | Yes | Maintained | 5.00E−05 | 2.8 | 0.55 |
| Reference Experimental Example B5 | $Li_{3.0}H_{3.4}La_3Zr_{1.4}Nb_{0.6}O_{12}$ | 3.4 | 100 | Yes | Maintained | Not measured | 2.8 | Not measured |

Figure 20:
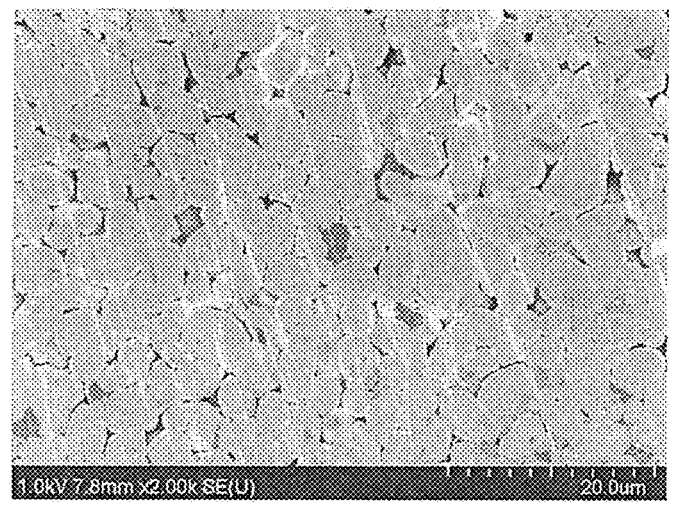
FIG. 20 is a SEM image of a pressed surface of an oxide electrolyte sintered body obtained in Reference Comparative Example B2 (z=0.13)
Figure 21:
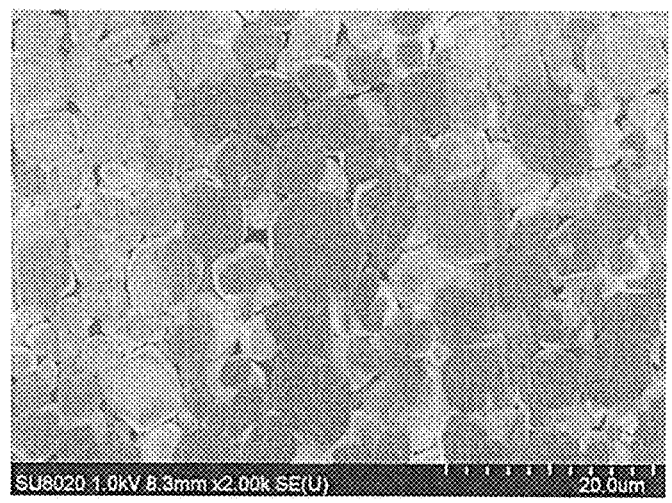
FIG. 21 is a SEM image of a pressed surface of an oxide electrolyte sintered body obtained in Reference Comparative Example B3 (z=0.4)

As shown in Table 1 and FIG. 10, among the garnet-type oxide electrolyte crystal particles represented by $(Li_{x-3y-z}, E_y, H_z) L_\alpha M_\beta O_\gamma$, the sintered body of Reference Comparative Example B1 using, as a raw material, the garnet-type oxide electrolyte crystal particles of Reference Comparative Example B1 in which H is not contained, has a low relative density of 70%. The sintered body of Reference Comparative Example B2 using the garnet-type oxide electrolyte crystal particles in which the hydrogen (H) content ratio z is 0.13, and the sintered body of Reference Comparative Example B3 using the garnet-type oxide electrolyte crystal particles in which z is 0.4, have low relative densities of less than 80%. As shown in FIGS. 20 and 21, from a SEM image of a pressed surface of the sintered body of Reference Comparative Example B2 and a SEM image of a pressed surface of the sintered body of Reference Comparative Example B3, it is clear that the garnet-type oxide electrolyte crystal particles rarely deformed, and voids are large.

Figure 11:
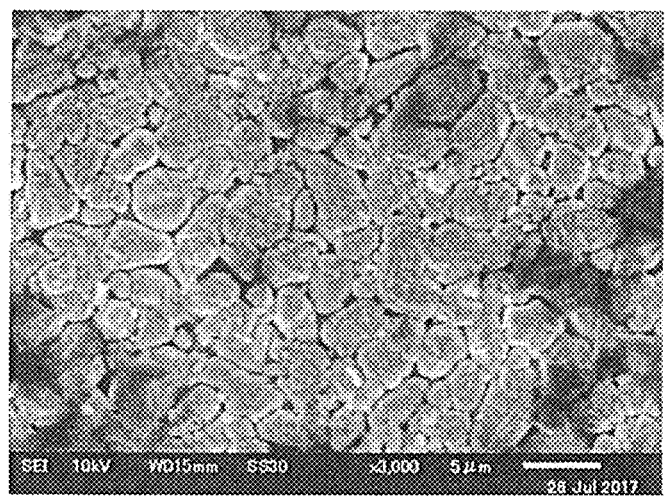
FIG. 11 is a SEM image of a pressed surface of an oxide electrolyte sintered body obtained in Reference Experimental Example B1 (z=0.75)
Figure 12:
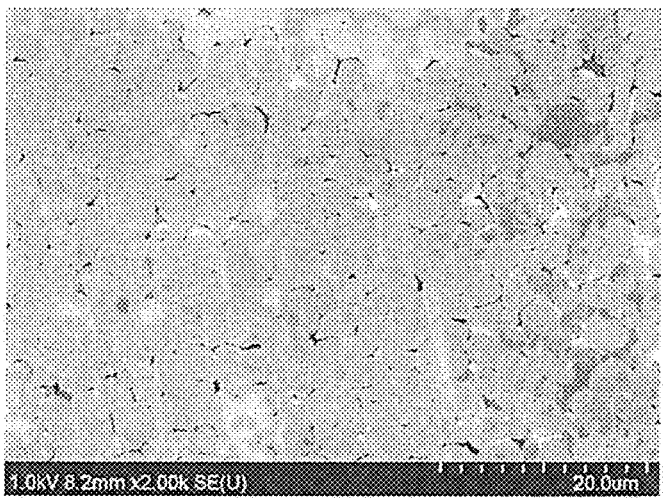
FIG. 12 is a SEM image of a pressed surface of an oxide electrolyte sintered body obtained in Reference Experimental Example B3 (z=0.91)
Figure 13:
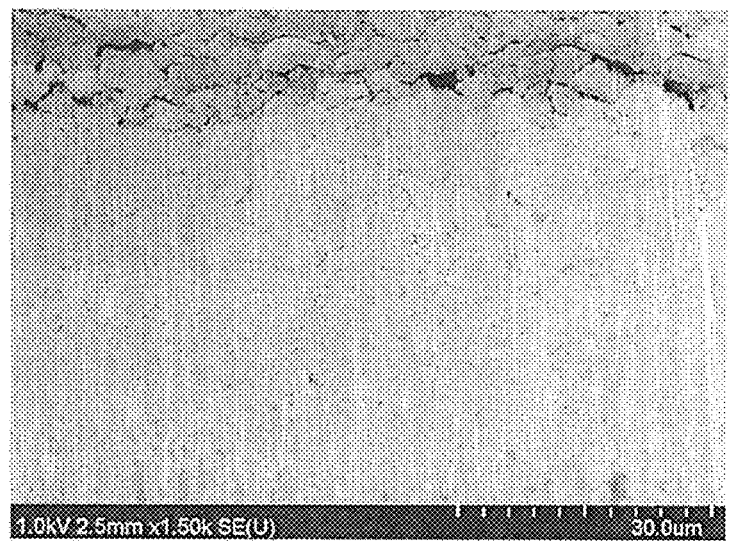
FIG. 13 is a SEM image of a pressed surface of an oxide electrolyte sintered body obtained in Reference Experimental Example B5 (z=3.4)

Therefore, it is clear that the garnet-type oxide electrolyte crystal particles represented by $(Li_{x-3y-z},E_y,H_z)L_\alpha M_\beta O_\gamma$, have poor formability when z is 0.4 or less. Meanwhile, as shown in Table 1, the sintered bodies of Reference Experimental Examples B1 to B5 using, among the garnet-type oxide electrolyte crystal particles represented by $(Li_{x-3y-z},E_y,H_z)L_\alpha M_\beta O_\gamma$, the garnet-type oxide electrolyte crystal particles in which the H content ratio is in the range of $0.75 \leq z \leq 3.4$, each have a high relative density of 88% or more. As shown in FIGS. 11 to 13, from SEM images of pressed surfaces of the sintered bodies of Reference Experimental Examples B1, B3 and B5, it is clear that the garnet-type oxide electrolyte crystal particles are moderately deformed while the crystal structure is retained, and voids are narrow. For the sintered bodies of Reference Experimental Examples B1 to B5, the flux was present at grain boundary triple junctions (voids).

For the sintered bodies of Reference Experimental Examples B1 to B5, the following facts are clear: the average crystal particle diameter of the garnet-type ion-conducting oxide is 3 μm or less; the value of $R_{gb}/(R_b+R_{gb}=R_{total})$ is 0.6 or less; the particle interfaces are sufficiently bonded; and the grain boundary resistance is sufficiently small.

From the above, it is clear that the method for producing the oxide electrolyte sintered body, the method comprising preparing the crystal particles of the garnet-type ion-conducting oxide represented by the general formula (D), preparing the lithium-containing flux, obtaining the complex by mixing the flux and the crystal particles of the garnet-type ion-conducting oxide, and sintering the complex by heating, provides excellent sintering properties and formability even at low temperature.

(2) Evaluation of Cathode Active Material Covered with Oxide Electrolyte Sintered Body It was examined whether the evaluation results of the oxide electrolyte sintered body obtained in the above (1) are reflected even in the case of covering the cathode active material.

a) Production of Cathode Active Material Covered with Oxide Electrolyte Sintered Body Production Example B1

[Preparing Garnet-Type Ion-Conducting Oxide Particles]

Garnet-type ion-conducting oxide crystal particles having the composition of $Li_{5.48}H_{0.91}La_3Zr_{1.4}Nb_{0.6}O_{12}$, were obtained in the same manner as Reference Experimental Example 3.

[Preparing Flux]

As a flux, $LiNO_3$ having a melting point of 260° C. and LiOH having a melting point of 462° C. were used.

$LiNO_3$ was dissolved in pure water at 60° C. until the water became supersaturated. Then, the water was cooled to 25° C. to decrease the saturation degree. $LiNO_3$ thus deposited was removed by filtration, thereby obtaining a $LiNO_3$ saturated solution at 25° C. In the same manner, a LiOH saturated solution at 25° C. was prepared. The $LiNO_3$ and LiOH concentrations of the saturated solutions were measured.

[Preparing Cathode Active Material]

$Li(Ni_{1/3}Co_{1/3}Mn_{1/3})O_2$ was prepared as a cathode active material.

[Mixing Garnet-Type Ion-Conducting Oxide Crystal Particles, Flux and Cathode Active Material]

The $LiNO_3$ saturated solution, the LiOH saturated solution, and the garnet-type ion-conducting oxide crystal particles having the composition of $Li_{5.48}H_{0.91}La_3Zr_{1.4}Nb_{0.6}O_{12}$, all of which were prepared above, were weighed at a molar ratio of 0.45:0.45:1.00.

Then, the weighed $LiNO_3$ and LiOH saturated solutions were each diluted about 10 to 20 times with anhydrous ethanol and mixed. The weighed garnet-type ion-conducting oxide crystal particles were put into the mixed solution.

The thus-obtained mixed solution was evaporated in a dry room at 25° C., thereby obtaining the garnet-type ion-conducting oxide crystal particles covered with the flux.

The thus-obtained garnet-type ion-conducting oxide crystal particles covered with the flux and the above-prepared cathode active material ($Li(Ni_{1/3}Co_{1/3}Mn_{1/3})O_2$) were dry-mixed at a volume ratio of 25:75 in a mortar.

[Sintering]

A mixed powder thus obtained was put in a uniaxial pressing machine and hot-pressed (temperature: 400° C., load: 4.0 ton/cm$^2$, time: 4 hours) to obtain the cathode active material covered with the oxide electrolyte sintered body of Production Example B1.

Comparative Production Example B1

A cathode active material covered with an oxide electrolyte sintered body of Comparative Production Example B1, was obtained in the same manner as Production Example B1, except that garnet-type ion-conducting oxide particles having the composition of $Li_{6.0}H_{0.4}La_3Zr_{1.4}Nb_{0.6}O_{12}$, were prepared in the same manner as Reference Comparative Example 3.

b) Electron Microscopy Observation

Figure 14:
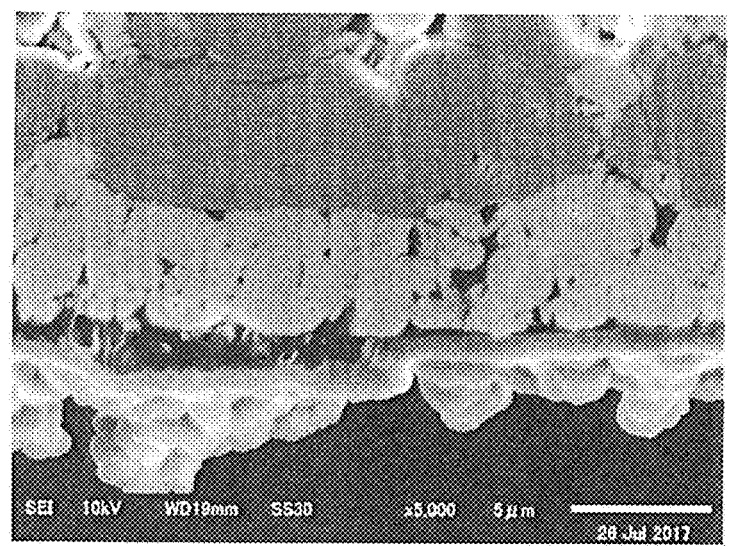
FIG. 14 is a SEM image of a section of a cathode active material covered with an oxide electrolyte sintered body obtained in Production Example B1.
Figure 15:
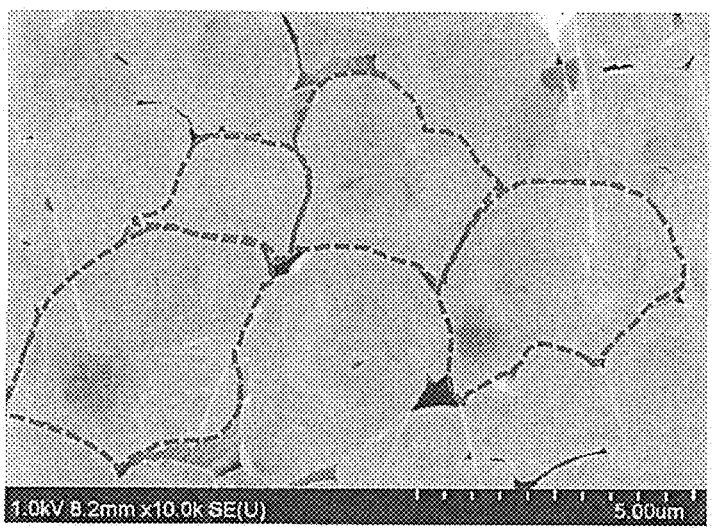
FIG. 15 is a SEM image of a section of, for the cathode active material covered with the oxide electrolyte sintered body obtained in Production Example B1, the layer of the oxide electrolyte sintered body covering the cathode active material.
Figure 22:
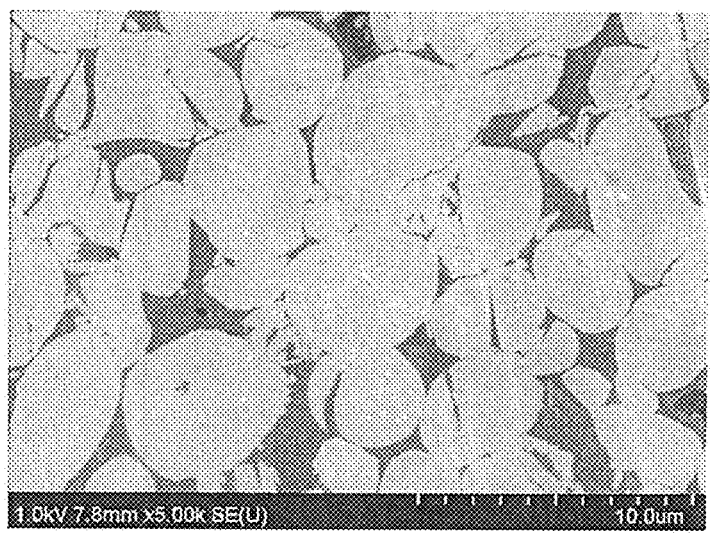
FIG. 22 is a SEM image of a section of, for a cathode active material covered with an oxide electrolyte sintered body obtained in Comparative Production Example B1, the layer of the oxide electrolyte sintered body covering the cathode active material.

SEM observation was carried out on a section of the cathode active material covered with the oxide electrolyte sintered body of Production Example B1 and a section of the cathode active material covered with the oxide electrolyte sintered body of Comparative Production Example B1. FIGS. 14 and 15 show SEM images of Production Example B1. FIG. 22 shows a SEM image of Comparative Production Example B1.

As shown in FIG. 22, from the SEM image of Comparative Production Example B1, it is clear that the garnet-type ion-conducting oxide crystal particles cracked and failed to cover the surface of the cathode active material.

Meanwhile, as shown in FIGS. 14 and 15, from the SEM images of Production Example B1, it is clear that the garnet-type ion-conducting oxide crystal particles were appropriately deformed and bonded to cover the surface of the cathode active material. Also, the oxide electrolyte sintered body as the covering layer had the properties of Reference Experimental Example B3 shown in Table 1. Therefore, it is thought that the cathode active material covered with the oxide electrolyte sintered body, is obtained when the production conditions of the oxide electrolyte sintered bodies of Reference Experimental Examples B1 to B5 are satisfied.

From the above, the following is clear: the cathode active material covered with the oxide electrolyte sintered body containing the crystal particles of the garnet-type ion-conducting oxide, is obtained by the covered active material production method comprising preparing the crystal particles of the garnet-type ion-conducting oxide represented by the general formula (D), preparing the lithium-containing flux, preparing the cathode active material, mixing the crystal particles of the garnet-type ion-conducting oxide, the flux and the cathode active material, and sintering the mixture by heating at a temperature of 650° C. or less.

3. Production of Cylindrical Battery

Example 1

A cylindrical battery was produced by the method shown in FIGS. 3A to 3C.

First, the intermediate 100*a* as shown in FIG. 3A, was prepared. The intermediate 100*a* is such that the rod-shaped cathode current collector 4 is the center; the precursor of the covered active material is disposed around the cathode current collector; and the separator material layer 3A is wound therearound. Details of the materials are as follows.

Cathode current collector 4: Ti rod

Precursor of coated active material: The mixture of the cathode active material and the garnet-type ion-conducting oxide crystal particles covered with the flux, which is a mixture at the stage prior to the sintering in Production Example B1

Separator material layer 3A: The separator material layer containing the garnet-type ion-conducting oxide crystal particles, the flux and the resin The intermediate 100*a* was subjected to integral sintering at a temperature of 400° C. By this sintering, the separator material layer 3A was converted into the separator 3, and the precursor of the covered active material was converted into the covered active material 1*e* (see FIG. 2).

The cylindrical battery of Example 1 was obtained by winding the anode 2 and the anode current collector 5 in this order around the intermediate 100*a* subjected to the integral sintering, and then injecting the aqueous electrolyte 1*a* into a void in the cathode. Details of the materials are as follows.

Anode 2: Li foil

Anode current collector 5: Ni foil

Aqueous electrolyte 1*a*: 3 mol/L lithium sulfate aqueous solution

REFERENCE SIGNS LIST

1. Cathode
1*a*. Aqueous electrolyte
1*b*. Cathode active material
1*c*. Void
1*d*. Second oxide electrolyte sintered body
1*e*. Covered active material
2. Anode
2*a*. Void
3. Separator
3A. Separator material layer
3*a*. First oxide electrolyte sintered body
3*b*. Resin
4. Cathode current collector
5. Anode current collector
6. Sealing
10. Typical example of layer structure of battery
20. Variation of layer structure of battery
31. Cathode active material
32. Covering layer
33. Aqueous electrolyte
34. Flux
35. Crystal particles of garnet-type ion-conducting oxide
36. Carbon
37. Second oxide electrolyte sintered body
100. Cylindrical battery
100*a*, 100*b*, 100*c*. Intermediate of cylindrical battery
200. Flat battery
200*a*. Intermediate of flat battery

The invention claimed is:

1. A battery comprising a cathode, an anode and a separator disposed between the cathode and the anode,
   wherein the cathode comprises an aqueous electrolyte and a cathode active material;
   wherein the anode comprises an anode active material;
   wherein the separator comprises a first oxide electrolyte sintered body and a resin;
   wherein the first oxide electrolyte sintered body has grain boundaries between crystal particles of a garnet-type ion-conducting oxide represented by the following general formula (A):

  General Formula (A)

$(Li_{x-3y-z}E_yH_z)L_\alpha M_\beta O_\gamma$ where E is at least one element selected from the group consisting of Al, Ga, Fe and Si; L is at least one element selected from the group consisting of an alkaline-earth metal and a lanthanoid element; M is at least one element selected from a transition element that can be six-coordinated with oxygen and elements in groups 12 to 15 of the periodic table; x, y and z are real numbers satisfying $3 \leq x-3y-z \leq 7$, $0 \leq y < 0.22$ and $0 \leq z < 3.4$; and $\alpha$, $\beta$ and $\gamma$ are real numbers in ranges of $2.5 \leq \alpha \leq 3.5$, $1.5 \leq \beta \leq 2.5$ and $11 \leq \gamma \leq 13$, respectively;
   wherein a number average particle diameter of the crystal particles is 3 μm or less;
   wherein the first oxide electrolyte sintered body satisfies the following formula 1:

$R_{gb}/(R_b+R_{gb}) \leq 0.6$   Formula 1 where $R_b$ is an intragranular resistance value that is an ion conductivity resistance inside the crystal particles, and $R_{gb}$ is a grain boundary resistance value that is an ion conductivity resistance of the grain boundaries between the crystal particles; and
   wherein the resin is present at grain boundary triple junctions between the crystal particles of the first oxide electrolyte sintered body.

2. The battery according to claim 1, wherein the anode is free from aqueous electrolyte.

3. The battery according to claim 1, wherein the separator is impermeable to aqueous electrolyte.

4. The battery according to claim 1,
   wherein the cathode active material is a cathode active material covered with a second oxide electrolyte sintered body;
   wherein the second oxide electrolyte sintered body has grain boundaries between the crystal particles of the garnet-type ion-conducting oxide represented by the general formula (A);
   wherein a number average particle diameter of the crystal particles of the second oxide electrolyte sintered body is 3 m or less; and
   wherein the second oxide electrolyte sintered body satisfies the formula 1 where $R_b$ is an intragranular resistance value that is an ion conductivity resistance inside the crystal particles of the second oxide electrolyte sintered body, and $R_{gb}$ is a grain boundary resistance value that is an ion conductivity resistance of the grain boundaries between the crystal particles thereof.

5. The battery according to claim 1,
wherein the cathode active material is a cathode active material covered with a second oxide electrolyte sintered body;
wherein the second oxide electrolyte sintered body has grain boundaries between the crystal particles of the garnet-type ion-conducting oxide represented by the general formula (A);
wherein a lithium-containing flux is present at grain boundary triple junctions between the crystal particles of the second oxide electrolyte sintered body; and
wherein the second oxide electrolyte sintered body satisfies the formula 1 where $R_b$ is an intragranular resistance value that is an ion conductivity resistance inside the crystal particles of the second oxide electrolyte sintered body, and $R_{gb}$ is a grain boundary resistance value that is an ion conductivity resistance of the grain boundaries between the crystal particles thereof.

6. The battery according to claim 1,
wherein the resin is at least one resin selected from the group consisting of polyimide resin, polybenzimidazole-based thermosetting resin, and polysiloxane-based thermosetting resin.

7. The battery according to claim 1,
wherein a melting temperature of the resin is 450° C. or less and a thermal decomposition temperature of the resin is 400° C. or more.

\* \* \* \* \*